United States Patent
Shibuya et al.

(10) Patent No.: US 10,887,490 B2
(45) Date of Patent: Jan. 5, 2021

(54) IMAGE PROCESSING APPARATUS, IMAGE PROCESSING SYSTEM, AND COMPUTER PROGRAM PRODUCT

(71) Applicant: Ricoh Company, Ltd., Tokyo (JP)

(72) Inventors: Takeshi Shibuya, Kanagawa (JP); Kazuki Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 154 days.

(21) Appl. No.: 16/277,561

(22) Filed: Feb. 15, 2019

(65) Prior Publication Data
US 2019/0260909 A1    Aug. 22, 2019

(30) Foreign Application Priority Data

Feb. 16, 2018  (JP) ................... 2018-026466
Feb. 26, 2018  (JP) ................... 2018-032345

(51) Int. Cl.
*H04N 1/60* (2006.01)
*G03G 15/04* (2006.01)

(52) U.S. Cl.
CPC ..... *H04N 1/6027* (2013.01); *G03G 15/04036* (2013.01); *H04N 1/6008* (2013.01); *H04N 1/6036* (2013.01); *H04N 1/6041* (2013.01); *H04N 1/6044* (2013.01); *H04N 1/6047* (2013.01)

(58) Field of Classification Search
CPC .. H04N 1/6027; H04N 1/6044; H04N 1/6036; H04N 1/6047; H04N 1/6008; H04N 1/6041; G03G 15/04036
See application file for complete search history.

(56) References Cited

U.S. PATENT DOCUMENTS

| | | |
|---|---|---|
| 2007/0046999 A1 | 3/2007 | Shibuya et al. |
| 2008/0291478 A1 | 11/2008 | Shibuya et al. |
| 2012/0206745 A1 | 8/2012 | Shibuya |
| 2013/0207996 A1 | 8/2013 | Shibuya |
| 2013/0286442 A1 | 10/2013 | Nishida |

(Continued)

FOREIGN PATENT DOCUMENTS

| | | |
|---|---|---|
| JP | 09-116768 | 5/1997 |
| JP | 2004-289200 | 10/2004 |

(Continued)

OTHER PUBLICATIONS

European Search Report dated Jul. 19, 2019, issued in corresponding European Application No. 19157372.4, 8 pages.

*Primary Examiner* — Christopher Wait
(74) *Attorney, Agent, or Firm* — Xsensus LLP

(57) ABSTRACT

An image processing apparatus includes a reflection characteristic detector, and a gradation characteristic correction unit. The reflection characteristic detector is configured to detect reflective characteristics of respective output images on respective print media formed in a temporarily shifted manner among print media on which output images corresponding to input image data are formed. The gradation characteristic correction unit is configured to correct gradation characteristics of the input image data such that the reflection characteristics of the respective output images on the respective print media detected by the reflection characteristic detector match.

17 Claims, 10 Drawing Sheets

(56) References Cited

U.S. PATENT DOCUMENTS

| | | |
|---|---|---|
| 2015/0116779 A1 | 4/2015 | Shibuya |
| 2016/0044209 A1 | 2/2016 | Tsukano |
| 2016/0132011 A1 | 5/2016 | Shibuya |
| 2017/0087910 A1 | 3/2017 | Nagashima |
| 2017/0223229 A1 | 8/2017 | Shojaku |
| 2018/0001658 A1* | 1/2018 | Gracia Verdugo .......................... H04N 1/00411 |

FOREIGN PATENT DOCUMENTS

| | | |
|---|---|---|
| JP | 2006-268213 | 10/2006 |
| JP | 2012-165296 | 8/2012 |
| JP | 2012-205124 | 10/2012 |
| JP | 2013-042463 | 2/2013 |
| JP | 2014-071433 | 4/2014 |
| JP | 2015-111804 | 6/2015 |
| JP | 2016-092653 | 5/2016 |
| JP | 2017-064979 | 4/2017 |
| JP | 2017-187585 | 10/2017 |
| JP | 2017-204786 A | 11/2017 |

* cited by examiner

IMAGE PROCESSING APPARATUS, IMAGE PROCESSING SYSTEM, AND COMPUTER PROGRAM PRODUCT

CROSS-REFERENCE TO RELATED APPLICATIONS

The present application claims priority under 35 U.S.C. § 119 to Japanese Patent Application No. 2018-026466, filed on Feb. 16, 2018 and Japanese Patent Application No. 2018-032345, filed on Feb. 26, 2018. The contents of which are incorporated herein by reference in their entirety.

BACKGROUND OF THE INVENTION

1. Field of the Invention

The present invention relates to an image processing apparatus, an image processing system, and a computer program product.

2. Description of the Related Art

Nowadays, digital printers of an electrophotographic type, an inkjet type, and the like are known. In such digital printers, in the case of printers that perform mass printing, output color stability in continuous output of several hundred sheets of paper, several thousand sheets of paper, or the like is required. In a use case in which same kinds of documents in which only partial contents are replaced for each several pages are repeated or a use case in which distributed printing is performed at a plurality of sites in particular, stable control of reproduced color is important.

However, unlike full-scale commercial printing, operational environments in which these digital printers are used are not necessarily strictly controlled in many cases. Given these circumstances, digital printers are often used under temperature environment and under humidity environments that influence print results.

Owing to mixed printing of various kinds of documents, there are many unavoidable unstable factors in which device conditions such as a tonner supply amount change. Given these circumstances, when stable control of output colors is required, machines are frequently stopped, and calibration that adjusts coloration and color deviation is required to be performed. With regard to calibration, Japanese Unexamined Patent Application Publication No. 2017-187585 discloses a print system that enables the calibration to be performed at an appropriate page position and the like, for example.

The fact that a color that should be originally printed is determined means that standard characteristics as a correspondence standard of a color to be printed relative to input data is prescribed in advance. The calibration is normally performed for the purpose of matching such standard characteristics with actual characteristics. Therefore, it is ideal to perform the calibration every time before a print job. Conventional technologies are described in Japanese Unexamined Patent Application Publication No. 2017-187585, Japanese Unexamined Patent Application Publication No. 2017-64979, and Japanese Unexamined Patent Application Publication No. 2012-205124, for example.

However, an increased number of calibration operations causes a problem in that paper losses increase and that the number of stops of jobs and work manhours increase. In addition, calibration information with low freshness is required to be diverted depending on situations.

In general, difference in colors is sensitively perceived when they are observed simultaneously while being placed side by side and is difficult to be perceived when they are compared with each other independently. Consequently, color consistency among pieces of printed matter within the same job, in which print results are often compared with each other while being placed side by side, is required to be controlled at a stricter level. However, deviation of the actual characteristics at the time of job start from the standard characteristics causes a problem in that a print color drifts until the actual characteristics match the standard characteristics by feedback.

SUMMARY OF THE INVENTION

According to one aspect of the present invention, an image processing apparatus includes a reflection characteristic detector, and a gradation characteristic correction unit. The reflection characteristic detector is configured to detect reflective characteristics of respective output images on respective print media formed in a temporarily shifted manner among print media on which output images corresponding to input image data are formed. The gradation characteristic correction unit is configured to correct gradation characteristics of the input image data such that the reflection characteristics of the respective output images on the respective print media detected by the reflection characteristic detector match.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
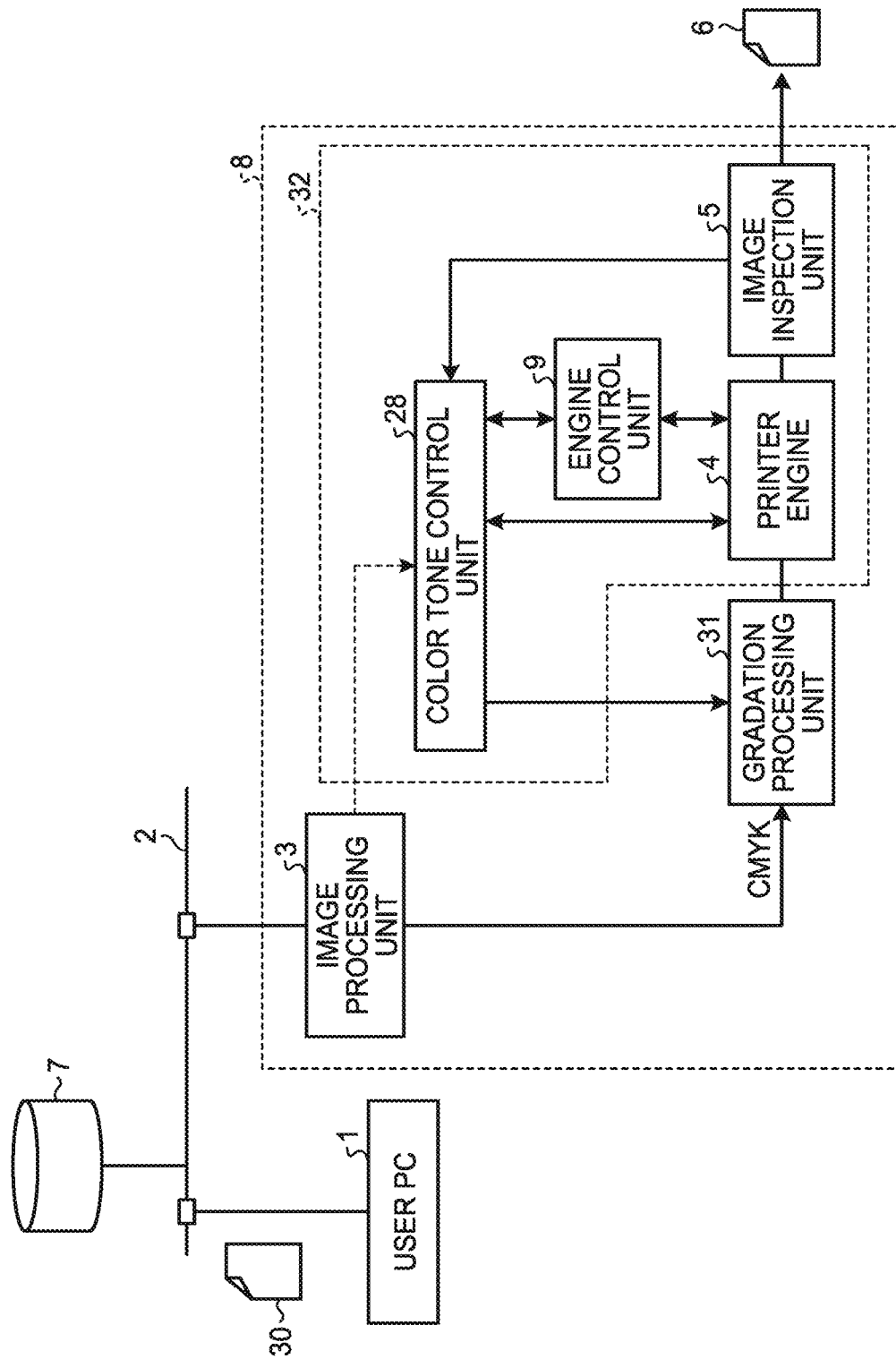
FIG. 1 is a system configuration diagram of an image processing system of a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The following describes an image processing system of embodiments in which an image processing apparatus, an image processing system, and a computer program for image processing are used as an example.

First Embodiment

System Configuration of First Embodiment

FIG. 1 is a system configuration of the principal part of an image processing system of a first embodiment. As illustrated in FIG. 1, the image processing system according to the first embodiment is formed by interconnecting a user's personal computer (a user PC) 1, a server apparatus 7, and an image forming apparatus 8 via a certain network 2 such as a local area network (LAN) or the Internet. At least one user PC 1 is connected to the network 2 and transmits image data and a print request to the image forming apparatus 8. The server apparatus 7 stores (accumulates) therein information required for color conversion performed by an image processing unit 3.

The image forming apparatus 8 has the image processing unit 3 that expands and processes document data 30 input via the network 2, an electrophotographic printer engine 4 that executes printing, and an engine control unit 9 that controls the printer engine 4. The image forming apparatus 8 has a gradation processing unit 31 that converts a pixel array expanded by the image processing unit 3 into the number of gradations outputtable by the printer engine 4 and an image inspection unit 5 that in-line inspects an output image 6 from the printer engine 4 before output. The image forming apparatus 8 has a color tone control unit 28 that detects color tone fluctuations (image density fluctuations, hue fluctuations, or the like) of the output image from an image detected by the image inspection unit 5 and supplies a correction parameter to the gradation processing unit 31.

The engine control unit 9 is provided in the same casing as the printer engine 4. The engine control unit 9, the printer engine 4, the image inspection unit 5, and the color tone control unit 28 form a main body unit group 32. Although in the example of FIG. 1 the gradation processing unit 31 is illustrated in the form of being provided outside the main body unit group 32, the gradation processing unit 31 may be provided within the main body unit group 32.

The image processing unit 3 includes software and an expansion board. The image processing unit 3 is separate from the main body unit group 32 and is exchangeable relative to the main body unit group 32.

The image inspection unit 5 includes an RGB line sensor (RGB: red, green, and blue) as an image measurement unit and a scanner 150 including a paper feeding mechanism. This image inspection unit 5 enables colorimetry of an image by plane.

Figure 2:
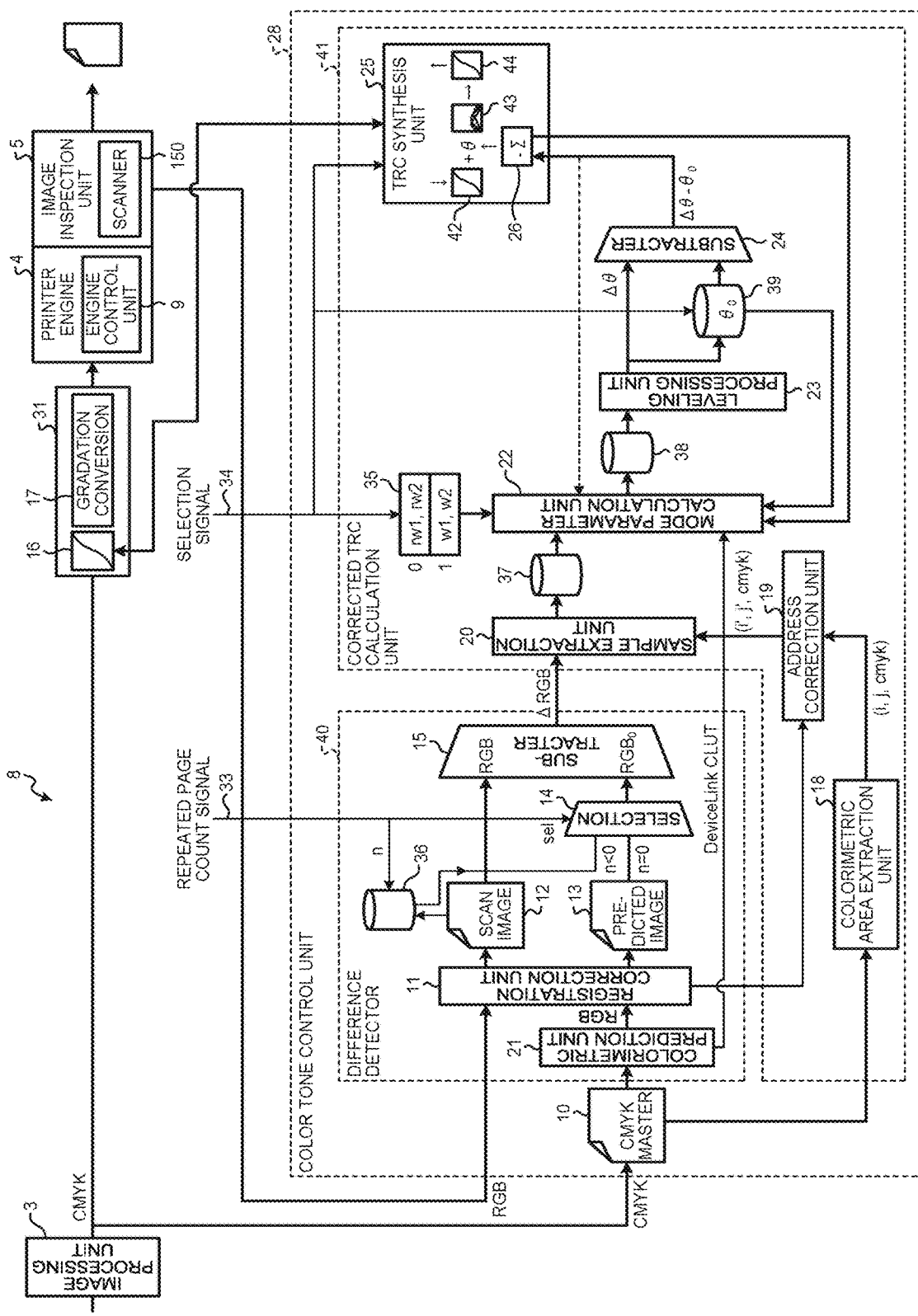
FIG. 2 is a block diagram of a configuration of a color tone control unit provided in the image processing system according to the first embodiment.

The document data 30 transmitted when the print request is made by the user PC 1 is normally transmitted to the image processing unit 3 via the network 2 in the form of data with a complicated data format including figure drawing instructions such as bitmap data or text data color-designated with RGB or CMYK (cyan, magenta, yellow, and black) as illustrated in FIG. 2, for example.

The image processing unit 3 is also called digital front-end (DFE). The image processing unit 3 expands the received data and supplies it as pixel array data (bitmap data or compressed-format data equivalent to the bitmap data) formed of basic colors of the printer engine 4 to the gradation processing unit 31. The gradation processing unit 31 subjects each pixel data of the bitmap data, for example, to conversion processing into image data with the number of gradations representable by the printer engine 4. The printer engine 4 forms the output image 6 on a sheet based on the bitmap data subjected to such conversion processing.

The image inspection unit 5 subjects the output image of the printer engine 4 to scan processing and supplies the output image to the color tone control unit 28. The color tone control unit 28, using a predicted value by a colorimetric prediction unit (the symbol 21 of FIG. 2) as a prediction unit described below or a scan image of initial print output stored in an image memory 36 as a target value, sets a gradation correction parameter that minimizes the difference between this target color and the color of the image subjected to the scan processing by the image inspection unit 5 in the gradation processing unit 31. With this setting, the gradation processing unit 31 can perform gradation correction processing on the document data 30 and stabilize the reproduced color of the output image 6.

Details of Color Tone Control Unit

FIG. 2 is a block diagram of functions of the color tone control unit 28. As illustrated in FIG. 2, the color tone control unit 28 has a difference detector 40 and a corrected TRC calculation unit 41 (TRC: tone reproduction curve). The difference detector 40 has a registration correction unit 11, a selector 14, a subtracter 15, a colorimetric prediction unit 21, and the image memory 36.

The corrected TRC calculation unit 41 has a colorimetric area extraction unit 18, an address correction unit 19, a sample extraction unit 20, a mode parameter calculation unit 22, a leveling processing unit 23, a subtracter 24, a TRC synthesis unit 25, a calculation condition selector 35, a sample memory 37, a first mode parameter memory 38, and a second mode parameter memory 39.

Part or the whole of such a difference detector 40 and a corrected TRC calculation unit 41 may be implemented by hardware. The registration correction unit 11, the selector 14, the subtracter 15, and the colorimetric prediction unit 21 of the difference detector 40 may be implemented by software. Similarly, the calorimetric area extraction unit 18, the address correction unit 19, the sample extraction unit 20, the mode parameter calculation unit 22, the leveling processing unit 23, the subtracter 24, the TRC synthesis unit 25, and the calculation condition selector 35 of the corrected TRC calculation unit 41 may be implemented by software. Computer programs for image processing for implementing the difference detector 40 and the corrected TRC calculation unit 41 by software are stored in a storage unit such as a read only memory (ROM), a random access memory (RAM), or a hard disk drive (HDD) of the image forming apparatus 8 and are executed by a control unit such as a central processing unit (CPU) of the image forming apparatus 8, whereby the above functions are implemented.

In FIG. 2, the image processing unit 3 expands a user document described in various input formats as described above into a CMYK image 10 which includes 8-bit pixel array of each of C, M, Y, K color components for each page.

The gradation processing unit 31 functioning as a gradation characteristic correction unit has a gradation correction table 16 and a gradation conversion unit 17. For the gradation correction table 16, what is called a look up table (LUT) can be used. The gradation conversion unit 17 converts a pixel array made into 8 bits for each colored surface of CMYK by the area gradation method into a pixel array with gradations with the number of bits (e.g., 2 bit) drawable by the printer engine 4.

The gradation correction table 16 is a correction table with 8-bit input and 8-bit output for each of CMYK colors, in which a table value (gradation correction data (TRC: tone reproduction curve)) that standardizes image density characteristics of the output image 6 corresponding to input of the gradation processing unit 31 is set by calibration in advance.

The scanner 150 is actually incorporated into the image inspection unit 5 directly connected (directly coupled) to the printer engine 4. The scanner 150 in-line scans the output image 6 formed by printing processing by the printer engine 4.

The color tone control unit 28 detects a change (difference) in print reproduced colors based on a scan image (RGB) formed by scanning the output image 6 from the printer engine 4 by the scanner 150 and the CMYK image 10 from the image processing unit 3. The color tone control unit 28 corrects the gradation correction data (TRC) of the gradation correction table 16 so as to reduce the detected difference therebetween. With this correction, the reproduced color of the output image 6 can be stabilized.

Prior to such a stabilization operation of the reproduced color, the image processing system according to the first embodiment sets a correspondence relation of scan image data (an RGB value) of the scanner 150 corresponding to the data of the CMYK image 10 as a multidimensional LUT in the colorimetric prediction unit 21 as a prediction unit by calibration performed in advance. The colorimetric prediction unit 21 predicts an RGB measured value scanned by the scanner 150 from a CMYK value of the CMYK image 10 by this multidimensional LUT and interpolation calculation. As an example, for such a prediction model, the device link model of ISO 15076-1 can be used.

The registration correction unit 11 corrects minute mutual image deviation (magnification, offset, rotation, and distortion) between a predicted image (RGB) 13 of the colorimetric prediction unit 21 and the scan image 12. Auxiliary information (correction parameters about magnification, offset, rotation, and distortion) required for this correction is shared as address correction information of the address correction unit 19 described below.

Next, a value n of a repeated page count signal 33 illustrated in FIG. 2 is supplied from the image processing unit 3. Specifically, when an actual repeated page count is larger than a preset prescribed number and when there is no repetition, the repeated page count signal 33 with "n=0" is supplied from the image processing unit 3. When the repeated page count signal 33 with "n=0" is supplied, no image data is read from the image memory 36, and the selector 14 selects the predicted image 13 as the standard image and supplies the predicted image 13 to the subtracter 15.

In contrast, when the value of the repeated page count signal 33 is "n>0", the scan image 12 of the initial n pages is successively stored in the image memory 36 and is supplied to the selector 14. After the initial n pages, the scan image is not stored in the image memory 36; at the timing of acquiring a new scan image 12, an image set stored in the image memory 36 is repeatedly read and output.

The subtracter 15 outputs differential image data obtained by subtracting the standard image from the scan image 12. In parallel with such processing by the subtracter 15, the colorimetric area extraction unit 18 extracts image areas with a relatively small image density change as image areas suitable for colorimetry in a colorimetric area with a preset size such as an area 2.5 square millimeters from the CMYK image 10 and creates an address list indicating the positions (colorimetric suitable area positions) of the respective extracted image areas.

The address correction unit 19 makes the colorimetric suitable area positions registered in the address list correspond to image positions of the differential image data output from the subtracter 15 based on the address correction information from the registration correction unit 11. The sample extraction unit 20 calculates a colorimetric area average (c, m, y, k, $\Delta r$, $\Delta g$, $\Delta b$) from the output image of the subtracter 15 and the CMYK image 10 by random sampling based on the corrected address list and stores the colorimetric area average in the sample memory 37 as first in first out (FIFO) provided as a measured sample accumulation unit.

The mode parameters are a vector of a parameter set which controls a gradation. The mode parameter calculation unit 22 determines update amounts of a set of mode parameters by a method of calculation described below based on the samples accumulated in the sample memory 37 and penalty values (a first value and a second value) given from the calculation condition selector 35 as a switching unit.

An initial mode parameter ($\theta 0$) and the mode parameter update amount ($\Delta\theta$) are calculated by a similar algorithm (e.g., Expression (8) described below or the like). To simplify the description, in the following, the mode parameter update amount may also be called simply the mode parameter. The symbol of tilde (~) in Expression (8) is not essential in the algorithm and is omitted to simplify the description.

A mode parameter (vector) as a gradation control parameter is a set of synthetic coefficients of a set of mode curves that best approximates a required TRC correction curve. In the case of a three mode in which three mode curves are used for each of CMYK colors, the mode parameter includes a total of 12 parameters. This mode parameter is stored in the first mode parameter memory 38 as a storage unit such as FIFO.

The leveling processing unit 23 removes a sample indicating an abnormal value among the samples stored in the sample memory 37 and averages a certain number of samples to determine the mode parameter update amount $\Delta\theta$.

A selection signal 34 indicating switching of a calculation condition for the mode parameter is also a signal indicating either of two conditions of "0" or "1". Specifically, a calculation condition corresponding to the value "0" of the selection signal 34 is made to correspond to a setting operation of a mode parameter standard "$\theta 0$" corresponding to an initial print state. A calculation condition corresponding to the value "1" of the selection signal 34 is made to correspond to a calculation operation of a mode parameter correction amount $\Delta\theta$ for correcting a print state change.

As an example, the setting operation of the standard $\theta 0$ is executed at the time of start of a consecutive print job.

However, even when a print state in which an image sample having sufficient reflection characteristics is difficult to be acquired continues, the standard θ0 is reset at the point in time when the image sample having sufficient reflection characteristics becomes able to be acquired, whereby an abrupt image density change by a control resumption can be prevented. Given these circumstances, in the image processing system according to the first embodiment, when the image sample having sufficient reflection characteristics is difficult to be acquired for a preset number of sheets printed or in a certain time interval, the value of the selection signal 34 is reset to "0".

When this selection signal 34 is "0", a parameter (a penalty value described below) corresponding to a first calculation condition for giving priority to estimation accuracy is selected from the calculation condition selector 35. Next, by output from the leveling processing unit 23, a value θ0 of the second mode parameter memory 39 as a gradation control parameter holding unit is updated to "θ0=Δθ" (it should be noted that the initial value is "0"). When the selection signal 34 is "1", a parameter corresponding to a second calculation condition for giving priority to the stability of a control result is selected by the calculation condition selector 35. In this case, the value of the mode parameter memory 39 is not updated.

The subtracter 24 subtracts the mode parameter θ0 held in the second mode parameter memory 39 from an output mode parameter Δθ of the leveling processing unit 23. Consequently, when the selection signal is "0" in particular, the subtracted value Δθ−θ0 is constantly "0".

The TRC synthesis unit 25 includes an integrator 26, a standard TRC storage unit 42 for each of CMYK colors, a mode curve storage unit 43, and a synthetic TRC generation unit 44. The mode curve storage unit 43 functions as what is called an LUT, in which a value of a mode curve of an approximated basis of a TRC change difference is loaded from a certain storage unit. The standard TRC storage unit 42 is an LUT similar to the gradation correction table 16. The integrator 26 changes the polarity (sign) of "Δθ−θ0" from the subtracter 24 and accumulates the "Δθ−θ0" with the polarity changed (corresponding to Expression (9) described below). At the time of start of a job and when the selection signal 34 is "0", the gradation correction table 16 is stored in the standard TRC storage unit 42 in the form of being copied, and all elements are initialized to "0".

The TRC synthesis unit 25 updates the gradation correction table 16 by a synthetic TRC generated by adding the sum of products of a mode curve read from the mode curve storage unit 43 with a corresponding element of the integrator 26 as a coefficient to the standard TRC stored in the standard TRC storage unit 42 at the timing of updating the value of the integrator 26 for each of CMYK colors.

Operation of First Embodiment

The following describes a detailed operation of the image processing system according to the first embodiment by such a configuration. First, in the case of a job in which a document the one set of which is preset prescribed pages or less is repeatedly printed, the value n (n>0) of the repeated page count signal 33 is set by the image processing unit 3. In line with this, the value of the selection signal 34 is also set to "1".

With this setting, the scan image 12 of the initial n pages is accumulated in the image memory 36. As described above, the same scan image 12 is also supplied to the selector 14, and the output result of the subtracter 15 (=the output of the difference detector 40) is all "0". This means that during the initial n pages update of the gradation correction data (TRC) by the posterior corrected TRC calculation unit 41 is not performed.

Next, in the (n+1)st page and later pages, the scan image 12 on the (n+1)st page and a scan image on the first page held in the image memory 36 corresponding thereto are compared with each other by the subtracter 15, and the difference (ΔRGB) between the scan images of the (n+1)st page and the first page is output from the difference detector 40. Similarly, (n+2)nd page is compared with the scan image 12 on the second page. In the following, similarly, the difference (a change: ΔRGB) between each scan image 12 and the initial image is output from the subtracter 15 of the difference detector 40.

Next, the sample extraction unit 20 of the corrected TRC calculation unit 41 accumulates a sample (Δrgb) of an RGB change of the scan image 12 in the sample memory 37 in association with an input value (cmyk) of the CMYK image 10 from a differential image supplied from the difference detector 40 based on the address list separately extracted from the CMYK image 10.

As described above, in the case of repeated print, the value "1" is set in the selection signal 34, and the mode parameter calculation unit 22 calculates the mode parameter Δθ based on the penalty value of the second calculation condition giving priority to the stability of a feedback result than estimation accuracy, an integrated value integrated by the integrator 26, and "a θ0 value (it should be noted that θ0=0 (which means all components of θ0 are set to 0))" stored in the second mode parameter memory 39.

The mode parameter Δθ calculated by the mode parameter calculation unit 22 is subjected to leveling (averaging) processing after abnormal values are excluded therefrom by the leveling processing unit 23. The value of the selection signal 34 is "1", and the value of the second mode parameter memory 39 is not updated to remain as the initial value "0". Consequently, from the subtracter 24, the mode parameter Δθ as a processing result of the leveling processing is output as it is.

In the TRC synthesis unit 25, prior to job start, the table values of the gradation correction table 16 are loaded to the standard TRC storage unit 42. Pieces of data of three curves defined in advance are loaded to the mode curve storage unit 43 as an LUT. The integrator 26 is initialized to "0".

The output value (Δθ−θ0) from the subtracter 24 is subjected to polarity reversal processing and is subjected to addition processing (=subtraction processing) by the integrator 26. An accumulated θ value as this addition processing result is used as coefficients corresponding to each of the three colors. The synthetic TRC generation unit 44 adds the sum of products of the data of the mode curves read from the mode curve storage unit 43 for each color component to the standard TRC to calculate the synthetic TRC as the above gradation correction data. The thus calculated synthetic TRC is returned to be written into the gradation correction table 16. In other words, the gradation correction data (TRC) stored in the gradation correction table 16 is updated to the synthetic TRC newly calculated by the TRC synthesis unit 25.

In the case of non-repeated print or when a repeated page unit exceeds an upper limit prescribed in advance, the value n of the repeated page count signal 33 is set to "n=0". While the number of sheets prescribed in advance is printed from the start of a print job, the value of the selection signal 34 is set to "0". In this case, the selector 14 of the difference detector 40 selects the predicted image 13. Consequently, the difference detector 40 outputs the difference between the scan image 12 and the predicted image 13 by the colorimetric prediction unit 21. The following flow of processing until being accumulated in the sample memory 37 is the same as that described above.

The mode parameter calculation unit 22, while the value of the selection signal 34 is "0", calculates the mode parameter based on observed values accumulated in the sample memory 37, the penalty value as the first calculation condition giving priority to accuracy, the integrated value integrated by the integrator 26, and the "θ0 value (it should be noted that θ0=0 in this state)" held in the mode parameter memory and accumulates the mode parameter in the first mode parameter memory 38. As described above, when the second mode parameter memory 39 is updated by the mode parameter leveled by the leveling processing unit 23, the value of the selection signal 34 is changed to "1". In the following processing, similarly to the above, update processing of the gradation correction data (TRC) of the gradation correction table 16 is performed.

Printer Engine

Figure 3:
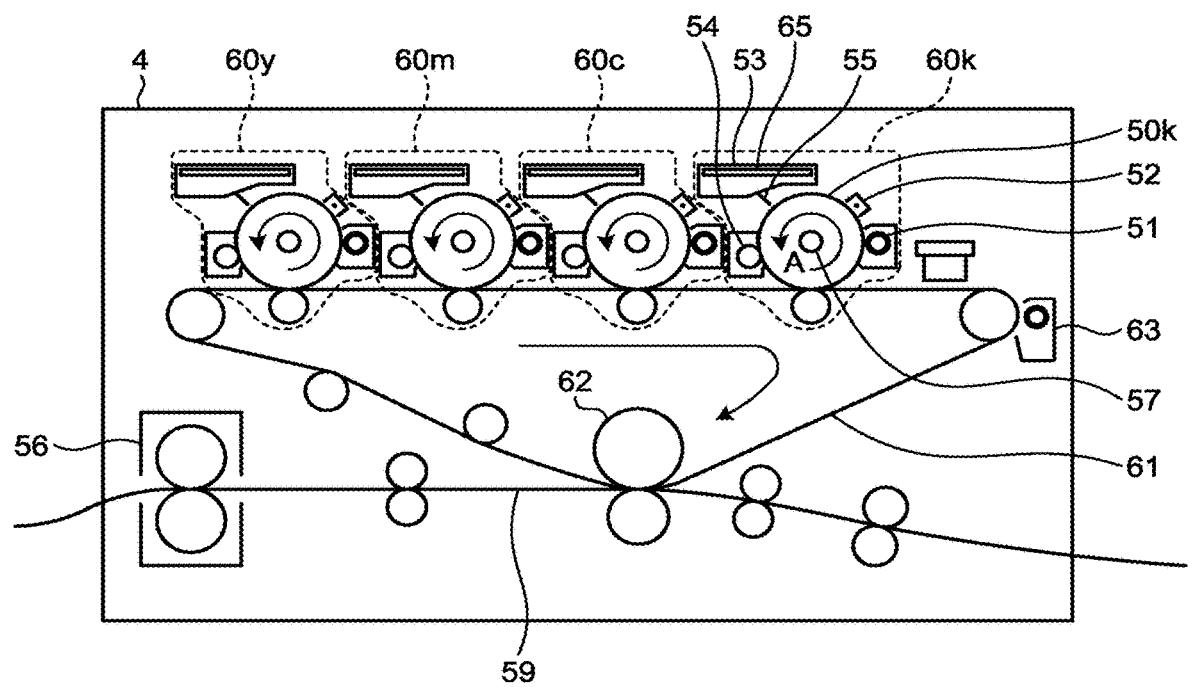
FIG. 3 is a vertical sectional view of a laser printer apparatus provided in the image processing system according to the first embodiment.

FIG. 3 illustrates a vertical sectional view of a laser printer apparatus as an example of the printer engine 4. First, a configuration and an operation of a developing unit 60k are described. A photoconductive drum 50k rotates in a direction of the arrow A in FIG. 3. This rotational position is detected by a rotation detector 57 provided at an end of the photoconductive drum 50k. To this photoconductive drum 50k, a charging unit 52 gives uniform electric charge to the surface of the photoconductive drum 50k cleaned by a cleaning roller 51.

Next, a laser beam 55 emitted from a laser unit 53 scans the surface of the photoconductive drum 50k while blinking in accordance with signals of an exposure control apparatus 65 to form an electrostatic latent image on the photoconductive drum 50k. The scanning direction of the laser beam 55 in this process is a main-scanning direction, whereas the rotation direction of the photoconductive drum 50k indicated by the arrow A in FIG. 3 is a sub-scanning direction.

The formed electrostatic latent image is developed by black (K) toner supplied by a developing roller 54 and charged at opposite potential to be a toner image. The toner image obtained by development is transferred to an intermediate transfer belt 61. Configurations and operations of developing units 60c, 60m, and 60y are also similar. In other words, the developing units 60c, 60m, and 60y form toner images of cyan (C), magenta (M), and yellow (Y), respectively, and successively transfer the toner images onto the intermediate transfer belt 61 in a superimposed manner. A belt cleaning mechanism 63 comes into contact with the intermediate transfer belt 61 in sync with the position of a colorimetric patch to remove the colorimetric patch on the intermediate transfer belt 61.

A transfer roller 62 collectively transfers the toner images of C, M, Y, and K superimposed on the intermediate transfer belt 61 to a sheet transferred on a paper conveyance path 59. A fixing unit 56 heats and presses the toner images on the sheet to fix them on the sheet.

Determination Operation of TRC Correction Amount

The following describes a TRC correction amount determination operation based on a measured value of an image in a colorimetric area on a user image. In the following description, a variable for each sample is considered as a probability variable, and a suffix of a sample No. is omitted.

First, it is assumed that an initial value of the gradation correction data determined by the calibration is set in the gradation correction table 16 of FIG. 2 corresponding to the colorimetric area on the user image. CMYK gradation values on the input side of the gradation processing unit 31 in this process are defined as (tilde c, tilde m, tilde y, tilde k), and a case in which each element is corrected by synthesis of two variable modes prescribed in advance is considered and are expressed as the following Expression (1). The reason why the number of the variable modes is two is for simplicity of description. For this reason, the number of the variable modes may be three or four, for example. A configuration example of the mode curve described below exemplifies a case of three modes, for example.

$$\begin{cases} \tilde{c} = c_0(c) + \theta_c^1 M_1(c) + \theta_c^2 M_2(c) \\ \tilde{m} = m_0(m) + \theta_m^1 M_1(m) + \theta_m^2 M_2(m) \\ \tilde{y} = y_0(y) + \theta_y^1 M_1(y) + \theta_y^2 M_2(y) \\ \tilde{k} = k_0(k) + \theta_k^1 M_1(k) + \theta_k^2 M_2(k) \end{cases} \quad (1)$$

In Expression (1), c, m, y, and k are CMYK gradation values before correction, c0, m0, y0, and k0 are standard gradation characteristics, M1 is a first variable mode (first mode curve), M2 is a second variable mode (second mode curve), and "θij" is a mode parameter (i={c, m, y, k}, j={1, 2}). In particular, the mode parameter is a real scalar, and the standard gradation characteristics and the variable modes M1 and M2 are independent real vectors of the same dimension defined on an input range D of the respective c, m, y, k gradation values. The superior suffix means, not an index, a simple suffix for identification. (Mathematically, the above mode is a basis of a low-dimensional subspace of a vector space formed of real number functions on D, but on implementation, is a curve implemented by an array or a combination of an array and interpolation. Details will be described below with reference to FIG. 4.)

The input range D is normally implemented by a real number of [0, 1] section, an integer of [0, 100] section or [0, 255] section, or the like. The relation of the linear term about "0" of Expression (1) is represented by matrix representation as the following Expression (2).

$$d\tilde{c} = M(c)d\theta \quad (2)$$

This Expression (2) is a condition of the following Expression (2-1) and Expression (2-2).

$$\tilde{c} = {}^t(\tilde{c}, \tilde{m}, \tilde{y}, \tilde{k}), \quad (2-1)$$
$$d\tilde{c} = {}^t(d\tilde{c}, d\tilde{m}, d\tilde{y}, d\tilde{k}),$$
$$d\theta = {}^t(\theta_c^1, \theta_c^2, \theta_m^1, \theta_m^2, \theta_y^1, \theta_y^2, \theta_k^1, \theta_k^2)$$

$$M(c) = \begin{bmatrix} c_1 & c_2 & 0 & 0 & 0 & 0 & 0 & 0 \\ 0 & 0 & m_1 & m_2 & 0 & 0 & 0 & 0 \\ 0 & 0 & 0 & 0 & y_1 & y_2 & 0 & 0 \\ 0 & 0 & 0 & 0 & 0 & 0 & k_1 & k_2 \end{bmatrix} \quad (2-2)$$

$$c_i = M_i(c), \, m_i = M_i(m), \, y_i = M_i(y), \, k_i = M_i(k)$$
$$(i = 1, 2)$$

The mode parameter θ0 approximating an initial print state is calculated by the following Expression (4) as the solution of the following Expression (3).

$$\theta_0 = \arg\min \left\{ E_{(x,c)\in S}{}^{\theta}[\|J(c) \, M(c) \, \theta - \{p_0(x) - L(c)\}\|^2] + w_1 \|\theta\|^2 \right\} \quad (3)$$

$$\theta_0 = (E[{}^t(JM)JM] + w_1 I)^{-1} E[{}^t(JM)(p_0 - L)] \quad (4)$$

"S" in Expression (3) is S={(xn, cn)|n=1, 2, . . . Ns} and is a sample set extracted from a user image associated with an average position x=(i, j) and an average input gradation value c=(c, m, y, k) of a sample image area and an average input gradation value c=(c, m, u, k). While p0=p0(x) is an actually measured value by the scanner 150 in initial print, L=L(c) is a predicted value by the colorimetric prediction unit 21.

J(c) in Expression (3) is a Jacobian matrix in an input value c=(c, m, y, k) of L shown in the following Expression (5).

$$J(c) = \begin{pmatrix} \frac{\partial r}{\partial c}(c) & \frac{\partial r}{\partial m}(c) & \frac{\partial r}{\partial y}(c) & \frac{\partial r}{\partial k}(c) \\ \frac{\partial g}{\partial c}(c) & \frac{\partial g}{\partial m}(c) & \frac{\partial g}{\partial y}(c) & \frac{\partial g}{\partial k}(c) \\ \frac{\partial b}{\partial c}(c) & \frac{\partial b}{\partial m}(c) & \frac{\partial b}{\partial y}(c) & \frac{\partial b}{\partial k}(c) \end{pmatrix}, \quad (5)$$

"E" in Expression (3) and Expression (4) is an expected value (e.g., a sample average). In these expressions, part of self-evident arguments is omitted.

Infinitesimal positive constants "w1" and "w2" in the following Expression (6) are penalties for reducing the magnitude of a change θi and act as regularization weights stabilizing the solution of Expression (4). For this value, appropriate values in connection with singular values of a matrix JM are defined based on an experiment in advance. In the following, the infinitesimal positive constants "w1" and "w2" will also be called a "penalty value w1" and a "penalty value w2," respectively.

In the process after the mode parameter θ0 in the intimal state has been determined, a change in the print state from the initial state is estimated by the following Expression (6).

$$\Delta\theta = \arg\min_{\Delta\theta} \left\{ \begin{array}{l} E_{(x,c)\in S}[\|JM\Delta\theta - \{p_{new} - p_0\}\|^2] + \\ w_1\|\theta_{old} - \Delta\theta\|^2 + w_2\|\Delta\theta\|^2 \end{array} \right\} \quad (6)$$

In this Expression (6), "pnew=pnew(x)" is a newly observed user image actually measured value, and "θold" is a value of the immediately preceding mode parameter used in this user image output. In the two penalty terms of Expression (6), "w1" is a penalty value inhibiting the magnitude of a mode parameter after update "θnew", and "w2" is a penalty value inhibiting a change from the immediately preceding "θold". In particular, when the value of the "penalty value w2" is set to be large, an abrupt change of the mode parameter can be inhibited, and milder response characteristics can be obtained. The new mode parameter θnew used in printing at the next step is given by "θnew=θold−Δθ".

In Expression (6), an area on the document for comparing pnew and p0 with each other (for taking the difference) is required to be the same area. For this reason, the application of Expression (6) is limited to repeated print of the same kind of documents. When this limitation is avoided, "p0≅L+JMθ0" as approximation by Expression (3) is used for Expression (6), "Δ tilde θ=Δθ+θ0", and by the following Expression (7), the update difference Δθ of the mode parameter θ is determined.

$$\Delta\theta = \arg\min_{\Delta\tilde{\theta}} \left\{ \begin{array}{l} E_{(x,c)\in S}[\|JM\Delta\tilde{\theta} - \{p_{new} - L\}\|^2] + \\ w_1\|\theta_{old} - (\Delta\tilde{\theta} - \theta_0)\|^2 + w_2\|\Delta\tilde{\theta} - \theta_0\|^2 \end{array} \right\}. \quad (7)$$

The solution of Expression (7) is obtained from the following Expression (8).

$$\Delta\tilde{\theta} = \{E[{}^t(JM)JM] + (w_1+w_2)I\}^{-1}\{E[{}^t(JM)(p_{new}-L)] + (w_1+w_2)\theta_0 + w_1\theta_{old}\} \quad (8)$$

With this calculation, a mode parameter for use in printing at the next step can be obtained as shown in the following Expression (9).

$$\theta_{new} = \theta_{old} - (\Delta\tilde{\theta} - \theta_0) \quad (9)$$

Further, Expression (7) has a structure equal to that of Expression (3), and Expression (8) can be used for the calculation of an initial mode parameter θ0 in place of Expression (4). In particular, with θ0=0 used as an initial value, Expression (8) and Expression (9) are repeatedly used for a sample set S=S0 of the same initial image, whereby solution contraction by penalty can be relaxed in the estimation of the initial mode parameter θ0. A specific algorithm will be described later.

Configuration Example of Variable Mode Curve (Basis Function)

Figure 4:
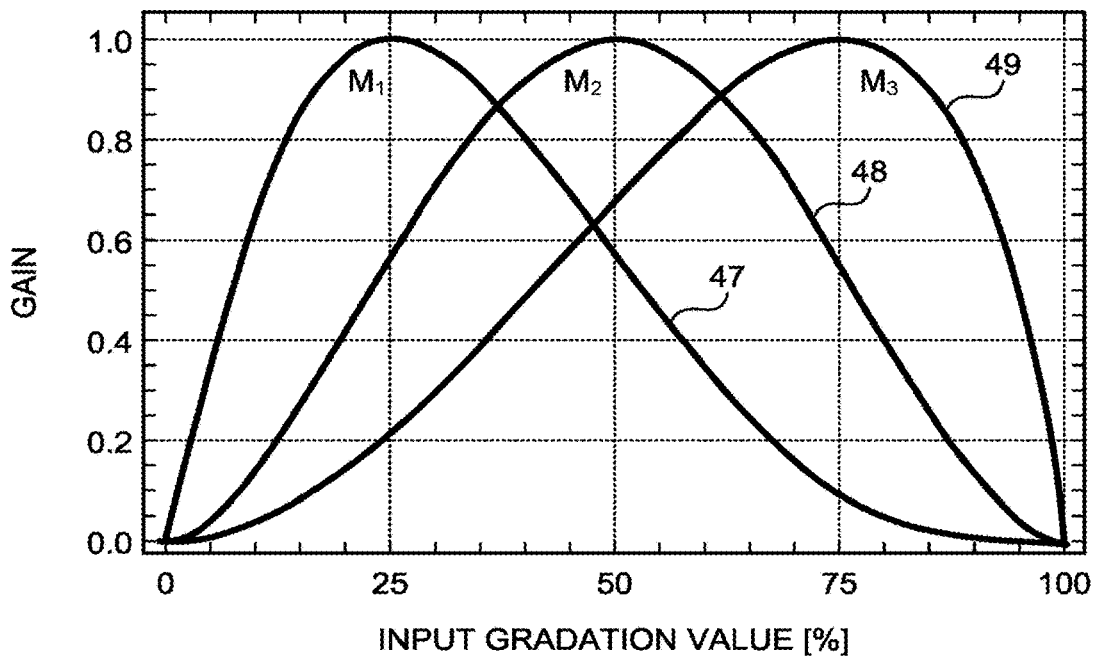
FIG. 4 is a diagram for illustrating a mode curve.

The following shows an example of the above variable mode curve with reference to FIG. 4. Although the above description describes the case of two modes as an example in order to simplify the description, FIG. 4 illustrates a selection example of mode curves (basis functions) in the case of three modes. In FIG. 4, the horizontal axis is an input gradation value (%), and the vertical axis is gain with the maximum value normalized as "1". A curve 47 is a first mode curve M1, a curve 48 is a second mode curve M2, and a curve 49 is a third mode curve M3. For these first to third mode curves M1 to M3, a combination that can approximate a gradation characteristic change effectively by as smaller number of ones as possible is preferably prepared; insisting on ones like a main component is not necessarily needed.

Figure 5:
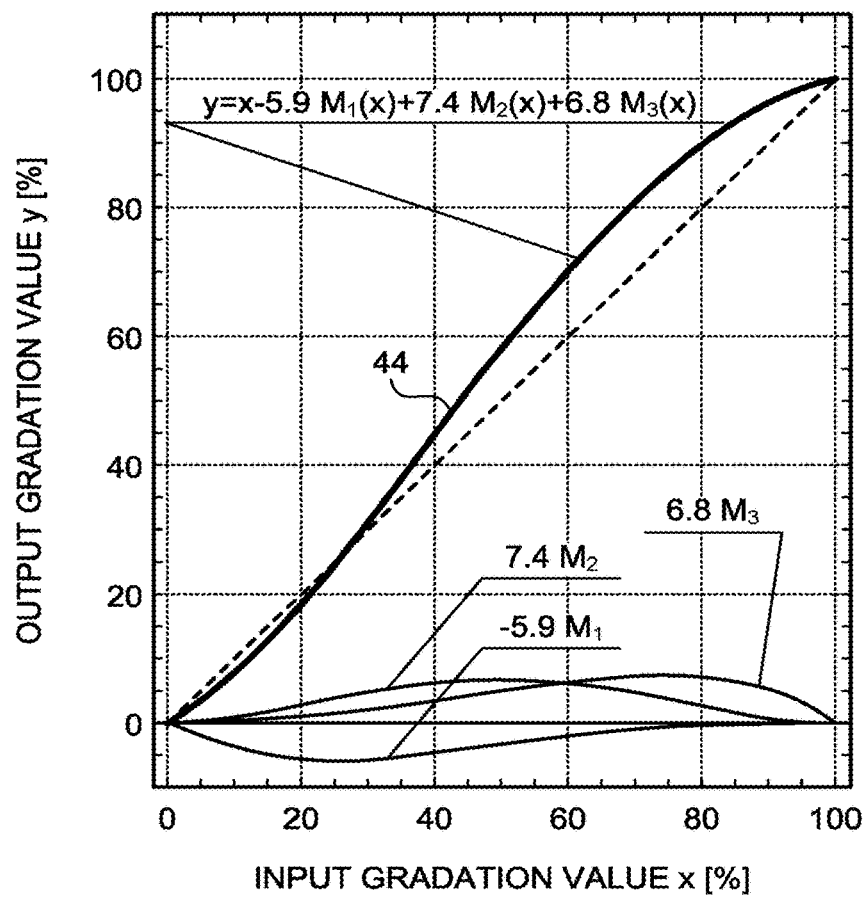
FIG. 5 is a diagram of an example of a gradation correction curve formed by performing synthetic processing on a plurality of mode curves.

FIG. 5 illustrates an example of a gradation correction curve formed by synthesizing these mode curves. A thick curve 44 illustrated in FIG. 5 indicates the gradation correction curve (a synthetic TRC) formed by synthesizing the three mode curves of the first to third mode curves M1 to M3 of FIG. 4. Thus, the first to third mode curves M1 to M3 are synthesized, whereby a sufficiently smooth synthetic TRC can be obtained. In the case of the example of the mode curves M1 to M3, the sum of products of coefficients the assumed gradation characteristics fluctuations of which are generally within a range of about −10(%) to +10(%) is calculated for identical standard gradation characteristics (y=x), whereby a synthetic TRC that is difficult to fail and is approximated as a sufficiently smooth curve can be obtained.

Given these circumstances, in the case of this example, a common mode curve can be used for all colors of C, M, Y, and K. In particular, the above synthetic TRC formed by combining different mode curves specialized in gradation characteristic change tendency for each color is used, whereby the gradation characteristic change can be approximated by a smaller number of modes. The gradation characteristic change is approximated by such a small number of modes, whereby gradation characteristic fluctuations can be estimated from a small number of more biased samples.

Procedure of θ Estimation Processing

Figure 6:
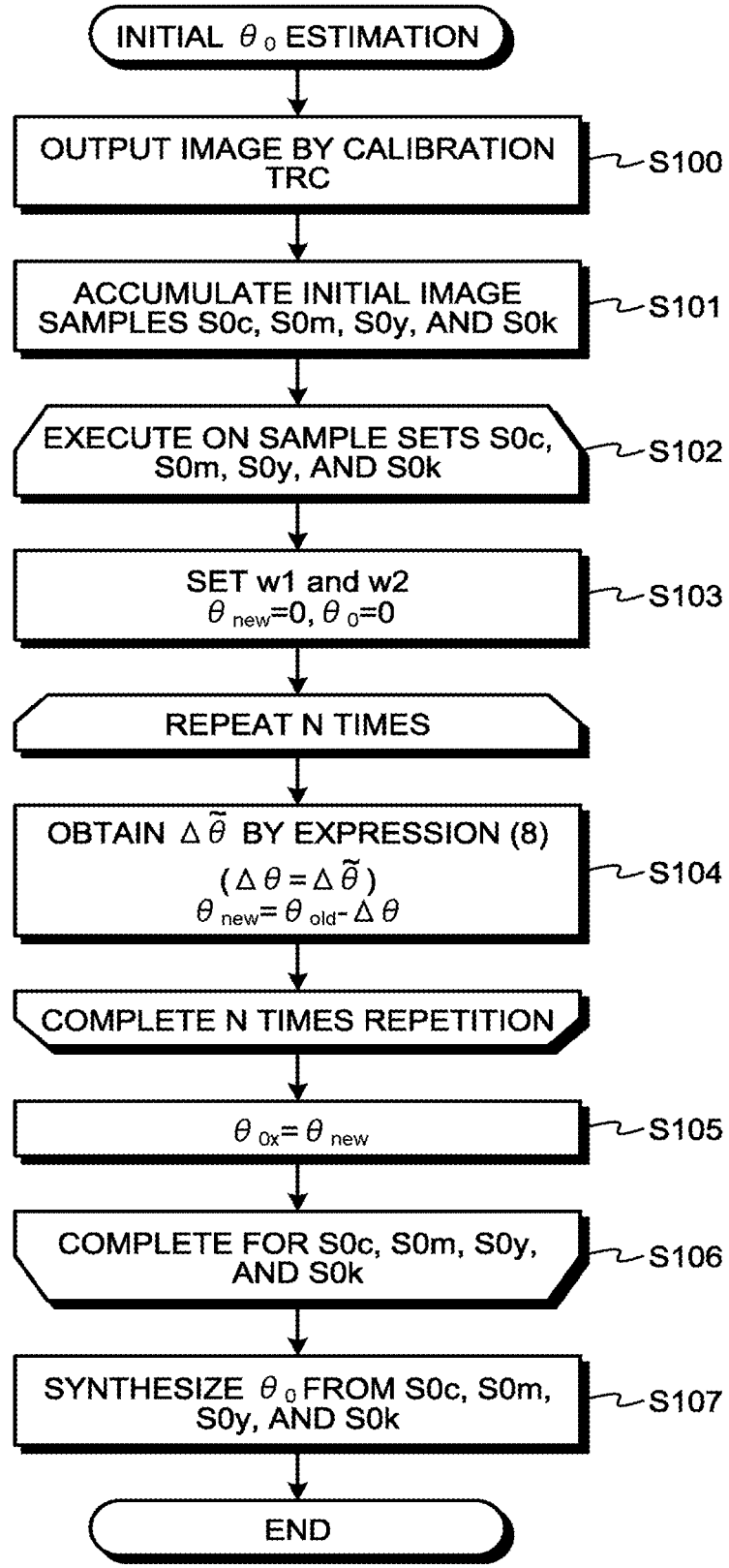
FIG. 6 is a flowchart of a procedure of an operation to estimate an initial mode parameter immediately after calibration in the image processing system according to the first embodiment.
Figure 7:
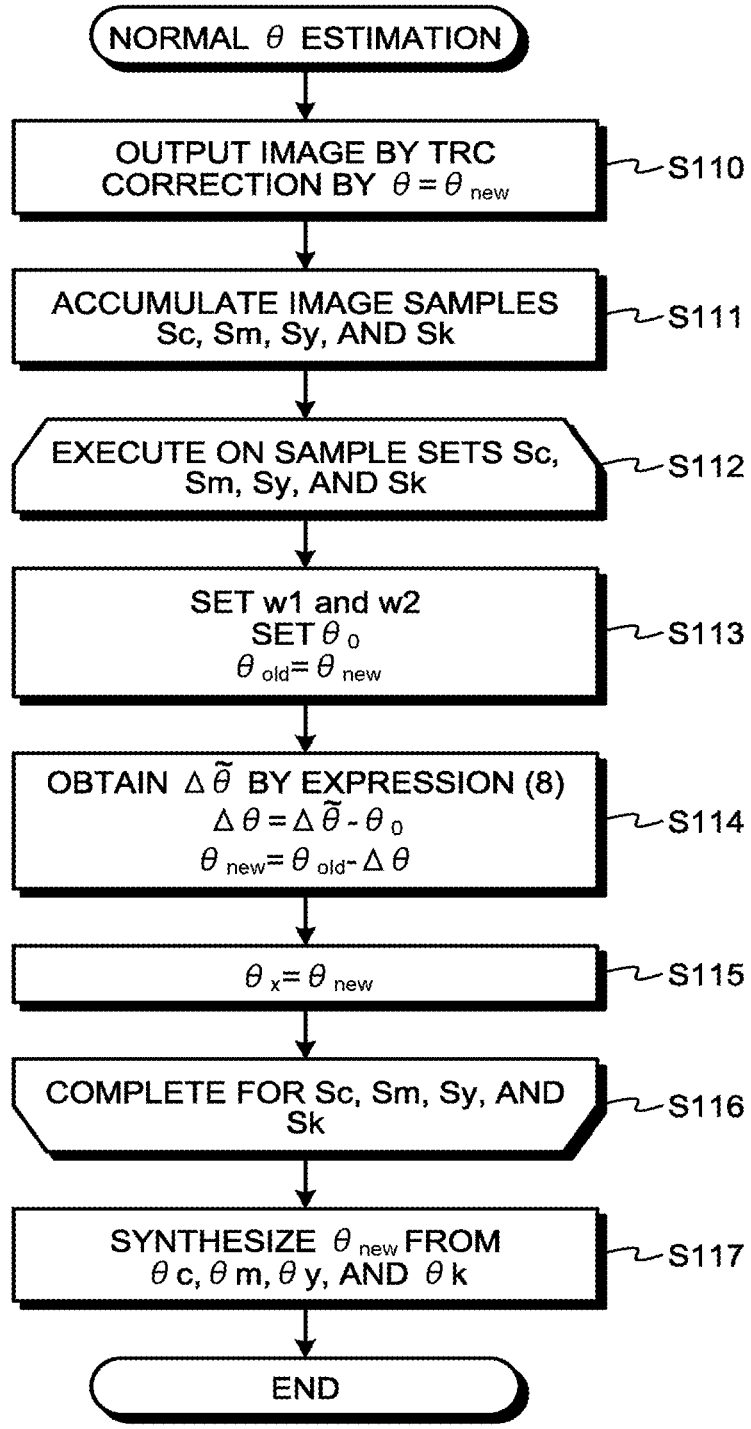
FIG. 7 is a flowchart of a procedure of an operation to estimate a normal mode parameter in the image processing system according to the first embodiment.

The flowcharts of FIG. 6 and FIG. 7 illustrate flows of a calculation operation of the mode parameter θ in the corrected TRC calculation unit 41 of FIG. 2. For simplicity of description, a description of a partial function such as the leveling processing unit 23 is omitted.

First, the flowchart of FIG. 6 is a flow of an operation to estimate the mode parameter θ0 in an initial state immediately after calibration (when the selection signal 34 is "0") when the repeated page count is "0". In this flowchart of FIG. 6, at Step S100, as described above, a calibration TRC is set in the gradation correction table 16, and output of a user image spreading over many pages is started.

Next, at Step S101, the sample memory 37 accumulates image samples. The gradation correction table 16 and the sample memory 37 may be implemented as software on a personal computer. The image samples accumulated in the sample memory 37 are accumulated with an input CMYK value and a differential ΔRGB value with the predicted value by the calorimetric prediction unit 21 as a pair. In particular, the sample memory 37 accumulates a mixed color sample set including a single color sufficiently including a cyan component (C) as "S0, c", accumulates a mixed color sample set including a single color sufficiently including a magenta component (M) as "S0, m", accumulates a mixed color sample set including a single color sufficiently including a yellow component (Y) as "S0, y", and accumulates a mixed color sample set including a single color sufficiently including a black component (K) as "S0, k".

Next, each processing at Step S102 to Step S106 is executed on the mixed sample sets "S0, c", "S0, m", S0, y", and "S0, k". Specifically, at Step S103, the first calculation condition is set for the penalty values rw1 and rw2, and "θnew" and "θ0" are both initialized to "0".

At Step S104, processing to update "θnew" is executed repeatedly a prescribed number of times such as N times (N is a natural number) in accordance with Expression (8) and Expression (9). The number of times of repetition may be one (N=1). It should be noted that "θ0" in Expression (8) is "0" at this point time.

At Step S105, "θnew" obtained by the repetition is held as "θ0, x" (x=c, m, y, and k).

Upon completion of the processing at Step S102 to S106 for all "S0, x" (x=c, m, y, and k), at Step S107, the cyan component is extracted from "θ0, c", the magenta component is extracted from "θ0, m", the yellow component is extracted from "θ0, y", and the black component is extracted from "θ0, k". The extracted components are then resynthesized to construct the initial mode parameter θ0, and the entire processing of the flowchart of FIG. 6 ends.

Although the description of this flowchart of FIG. 6 is given with the repeated page count being "0", when the repeated page count is not "0", the differential image accumulated in the sample memory 37 is the difference from an initial print image, and the value of the initial mode parameter θ0 is fixed to "0".

Next, the flowchart of FIG. 7 is a flow of an operation to estimate a normal (when the selection signal 34 is "1") mode parameter θ. In this case, printing is continuing based on TRC determined based on some "θnew" (Step S110). At Step S111, similarly to the description of FIG. 6, the image samples are accumulated in the sample memory 37. In this process, a mixed color sample set including a single color sufficiently including a cyan component (C) is accumulated as "Sc", a mixed color sample set including a single color sufficiently including a magenta component (M) is accumulated as "Sm", a mixed color sample set including a single color sufficiently including a yellow component (Y) is accumulated as "Sy", and a mixed color sample set including a single color sufficiently including a black component (K) is accumulated as "Sk".

Next, each processing at Step S112 to S116 is executed on the mixed sample sets "Sc", "Sm", "Sy", and "Sk". Specifically, at Step S113, the second calculation condition is set for the penalty values w1 and w2, θ0 is set to a value determined in the flow of the flowchart of FIG. 6, and "θold" is changed to "θnew" (θold=θnew).

At Step S114, "θnew" is updated in accordance with Expression (8) and Expression (9). "θnew" is then held as "θx" (x=c, m, y, and k).

Upon completion of the processing at Step S112 to Step S116 for Sx (x=c, m, y, and k), the process advances to Step S117. At Step S117, the cyan component is extracted from θc, the magenta component is extracted from θm, the yellow component is extracted from θy, and the black component is extracted from θk. The components are then resynthesized to construct an updated mode parameter θnew, and the entire processing of the flowchart of FIG. 7 ends.

Effects of First Embodiment

As is clear from the foregoing description, the image processing system according to the first embodiment can maintain the initial print state and can obtain pieces of printed matter with stable color reproducibility in a print job performed based on many primary colors. Even when the actual characteristics at the time of start of consecutive printing are somewhat deviated from the calibration in particular, with color stability given priority, the initial printing characteristics can be maintained (an image stabilizing technique for color images can be provided).

Second Embodiment

The following describes an image processing system of a second embodiment. When gradation correction is performed in real time based on a printed user image, gradation correction accuracy may degrade due to a lack of an information amount. Specifically, the tendency of the user image to be printed varies, in which there are some images the information amount of which is insufficient in connection with the configuration of the image and it is difficult to obtain sufficient gradation correction accuracy. When the information amount is insufficient, a calculation error of a gradation correction amount is large, and correction stronger than required is applied, causing inconvenience that the difference from a target color is large (overcorrection). When this overcorrection occurs, the correction accuracy of gradation correction reduces, and it is difficult to maintain the reliability of printing.

This image processing system according to the second embodiment is an example in which with a plurality of images as one set, the information amount insufficient in a single image is compensated for, whereby overcorrection is prevented, and gradation correction accuracy is improved.

The following describes an example in which gradation correction is performed with an information amount with such a plurality of images as one set in the image system according to the first embodiment as the second embodiment. However, a gradation correction operation to be described in the second embodiment can also be used for a printing system that performs conventional calibration, and in this case also, an effect similar to that described below can be obtained. Refer to the following description for details.

Configuration of Color Tone Control Unit

Figure 8:
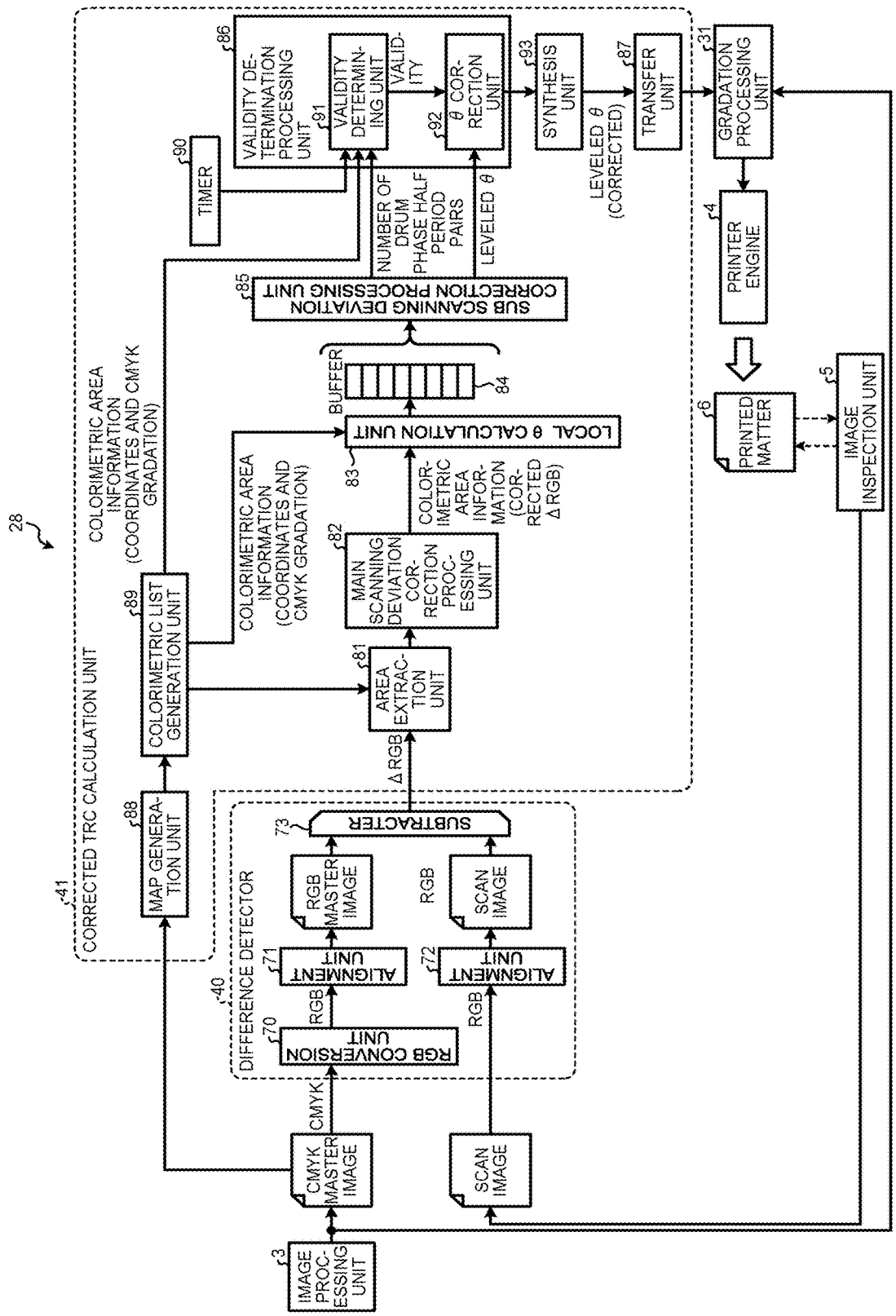
FIG. 8 is block diagram of a configuration of a color tone control unit provided in an image processing system of a second embodiment.

FIG. 8 is a block diagram of functions of the color tone control unit 28. As illustrated in FIG. 8, the color tone control unit 28 has the difference detector 40 and the corrected TRC calculation unit 41 (TRC: tone reproduction curve). The difference detector 40 has an RGB conversion unit 70, alignment units 71 and 72, and a subtracter 73.

The corrected TRC calculation unit 41 has an area extraction unit 81, a main scanning deviation correction processing unit 82, a local θ calculation unit 83, a storage unit (a buffer memory) 84, a sub scanning deviation correction processing unit 85, a validity determination processing unit 86, a transfer unit 87, a map generation unit 88, a colorimetric list generation unit 89, and a timer 90. The validity determination processing unit 86 has a validity determining unit 91 and a θ correction unit 92.

Part or the whole of such a difference detector 40 and a TRC calculation unit 41 may be implemented by hardware, or part or the whole thereof may be implemented by software. Computer programs for image processing for implementing the difference detector 40 and the TRC calculation unit 41 are stored in a storage unit such as a read only memory (ROM), a random access memory (RAM), or a hard disk drive (HDD) of the image forming apparatus 8 and are executed by a control unit such as a central processing unit (CPU) of the image forming apparatus 8, whereby the above functions are implemented.

In FIG. 8, the image processing unit 3 supplies the document data 30 described in various input formats as described above as a CMYK master image in which each value of CMYK is an 8-bit frame sequential pixel array for each page to the difference detector 40, the TRC calculation unit 41, and the gradation processing unit 31.

The gradation processing unit 31 converts a pixel array made into 8 bits for each colored surface of CMYK by the area gradation method, for example, into a pixel array with gradations with the number of bits (e.g., 2 bit) drawable by the printer engine 4 and outputs the pixel array. The image inspection unit 5 is actually directly connected (directly coupled) to the printer engine 4 and in-line scans the output image 6 formed by printing processing by the printer engine 4.

The difference detector 40 of the color tone control unit 28 detects a change (difference) in print reproduced colors based on a scan image (RGB) formed by scanning the output image 6 from the printer engine 4 by the image inspection unit 5 and an RGB master image obtained by converting the CMYK master image from the image processing unit 3 into an RGB image. The corrected TRC calculation unit 41 of the color tone control unit 28 sets the gradation correction data (TRC) that makes the detected difference between the two small in the gradation processing unit 31. With this setting, the reproduced color of the output image 6 can be stabilized.

Specifically, the corrected TRC calculation unit 41 performs gradation correction processing in real time based on the CMYK master image and data obtained from the difference between the RGB master image and the scan image. The corrected TRC calculation unit 41 calculates a coefficient (hereinafter, a θ value) for a color fluctuation model from RGB difference data (ΔRGB) as the difference between the RGB master image and the scan image obtained from the difference detector 40 and the CMYK master image obtained from the image processing unit 3 to update the gradation correction data (TRC) and supplies the gradation correction data (TRC) to the gradation processing unit 31.

Operation of Difference Detector

Operations of the units of the difference detector 40 are as follows. The RGB conversion unit 70 has a data table in which a CMYK value of the document data 30 and an RGB value obtained from the document data 30 are made to correspond to each other. The value of this data table is updated for each calibration. The RGB conversion unit 70 refers to the data table and thereby converts the CMYK value (the CMYK master image) of the document data 30 into the RGB value to form the RGB master image.

The alignment unit 71 and the alignment unit 72 correct positional deviation between the scan image formed by in-line scanning printed matter 6 by the image inspection unit 5 and the RGB master image described above (alignment processing). The subtracter 73 detects the difference between the scan image scanned by the image inspection unit 5 and the RGB master image and supplies the difference data (ΔRGB) to the area extraction unit 81 of the corrected TRC calculation unit 41.

Operation of Corrected TRC Calculation Unit Operations of the units of the corrected TRC calculation unit 41 are as follows. The map generation unit 88 extracts a small area that can be used as a colorimetric area for each of CMYK colors from the CMYK master image and forms a map that integrates all the extracted colorimetric areas. As an example, the map generation unit 88 extracts the small area based on the following conditions.

1. The size of the small area is 20×20 pixels (changeable);
2. An image density change of each color within an extended area obtained by extending the small area is small;
3. The size of the extended area is 50×50 pixels (changeable);
4. The small area is separate from an end of paper by a fixed value or more;
5. The average image density of each color within the small area is within a fixed value range;
6. A toner total amount within the small area is a certain amount or less;
7. In the case of a CMY plate, the image density of mixed K is less than a fixed threshold; and
8. In the case of a K plate, there is a certain image density or more relative to the image density of mixed CMY. A map formed based on such conditions is used for colorimetric list generation.

The colorimetric list generation unit 89 selects a prescribed number of colorimetric areas from each segment at random based on the map to form a "colorimetric list". The segment is each area obtained by equally dividing the image in the sub-scanning direction. The number of divisions of the image is 16 segments per page, for example (changeable). The above "θ value" is calculated based on information on the colorimetric areas registered in the colorimetric list.

Next, the area extraction unit 81 extracts the RGB difference data corresponding to the colorimetric areas registered in the colorimetric list and supplies the RGB difference data to the main scanning deviation correction processing unit 82 together with coordinates information and CMYK gradation information.

Image density variations in the main-scanning direction occur caused by deviation of a developer and toner and charging variations, whereby fluctuation deviation (main scanning deviation) may occur in a color printed along the main-scanning direction. The main scanning deviation correction processing unit 82 calculates a main scanning deviation amount based on the coordinates information and the CMYK gradation information for the extracted colorimetric areas. The main scanning deviation correction processing unit 82 subtracts the calculated main scanning deviation amount from the RGB difference in the colorimetric areas to form RGB difference data with the influence of the main scanning deviation removed and supplies the RGB difference data to the posterior local θ calculation unit 83.

The local θ calculation unit 83 calculates local θ for each of the above segments based on the coordinates information, the CMYK information, and the RGB difference information subjected to the main scanning deviation correction processing of the colorimetric areas registered in the colorimetric list. The calculated local θ of each of the segments is stored in the storage unit 84 such as a buffer memory. A segment in which a sufficient number of colorimetric areas are difficult to be obtained is an invalid segment, and local θ calculated from this invalid segment is not used.

Next, the photoconductor drum (the symbol 50$k$ of FIG. 3 or the like), which is normally positioned by strict control, causes a minute eccentricity between a drum rotational shaft and a central axis of the drum due to variations within parts control accuracy. When such eccentricity occurs, periodic fluctuations (sub scanning deviation) corresponding to the phase of the photoconductor drum occur. The sub scanning deviation periodically appears. For this reason, colors at positions at which a drum period is deviated by half phase can compensate and reduce the influence of the sub scanning deviation.

The sub scanning deviation correction processing unit 85 detects pairs of local θ calculated from the area in which the drum period is deviated by half phase among the pieces of local θ calculated by the local θ calculation unit 83. In this process, when a prescribed number of pairs or more are detected, the sub scanning deviation correction processing unit 85 averages the pairs of local θ to handle as one local θ and further averages θ calculated from the pairs to provide a final θ value (leveled θ). When the number of pairs is less than the prescribed number, the sub scanning deviation correction processing unit 85 averages all pieces of local θ to provide a final θ value (leveled θ). This leveled θ is a coefficient for gradation correction for common use in the input image with a plurality of pages forming one set.

The validity determination processing unit 86 determines the validity of the leveled θ for performing gradation correction based on timer information from the timer 90, the number of drum phase half period pairs detected by the sub scanning deviation correction processing unit 85, and colorimetric area information from the colorimetric list generation unit 89 and corrects the value of the leveled θ based on a determination result. The synthesis unit 93 generates (updates) the gradation correction data (TRC) based on the corrected θ value and supplies the gradation correction data (TRC) to the transfer unit 87. The transfer unit 87 supplies the generated gradation correction data (TRC) to the gradation processing unit 31. With this process, printing is executed with a CMYK image subjected to the gradation correction processing, and printed matter with stable color reproducibility can be obtained with the initial printing characteristics maintained.

Overall Procedure of Printing Processing

Figure 9:
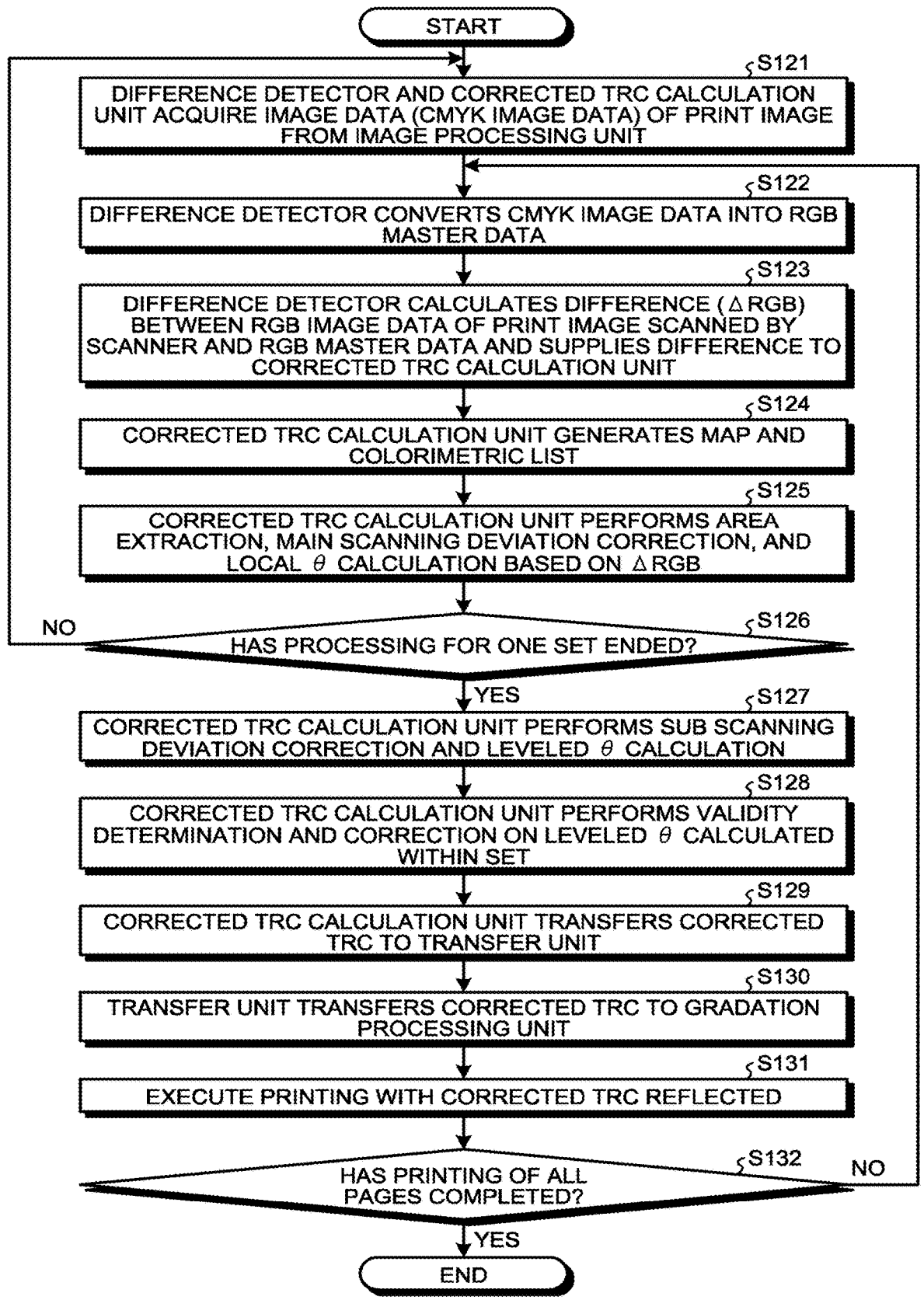
FIG. 9 is a flowchart of a procedure of an operation of gradation correction processing of the image processing system according to the second embodiment.

The following describes an overall procedure of printing processing using the flowchart of FIG. 9. Each processing of the area extraction unit 81, the main scanning deviation correction processing unit 82, the local θ calculation unit 83, the sub scanning deviation correction processing unit 85 (including leveled θ calculation), the validity determination processing unit 86, the map generation unit 88, the colorimetric list generation unit 89, and the synthesis unit 93 described below is performed independently for each color plate of CMYK.

First, at Step S121, the difference detector 40 and the corrected TRC calculation unit 41 acquire image data (CMYK image data) of a print image from the image processing unit. At Step S122, the RGB conversion unit 70 of the difference detector 40 converts the CMYK image data into RGB master data.

At Step S123, the subtracter 73 of the difference detector 40 calculates the difference (ΔRGB) between the RGB image data of the print image scanned by the inspection unit 5 (the scanner) and the RGB master data and supplies the difference to the corrected TRC calculation unit 41.

At Step S124, the map generation unit 88 of the corrected TRC calculation unit 41 extracts small areas that can be used as colorimetric areas for each of CMYK colors based on the above 1 to 8 conditions from the CMYK master image and forms a map that integrates all the extracted colorimetric areas. At Step S124, the colorimetric list generation unit 89 of the corrected TRC calculation unit 41 selects a prescribed number of colorimetric areas from each segment at random based on the map to form the "colorimetric list".

At Step S125, the area extraction unit 81 of the corrected TRC calculation unit 41 extracts the RGB difference data corresponding to the colorimetric areas registered in the colorimetric list and supplies the RGB difference data to the main scanning deviation correction processing unit 82 together with the coordinates information and the CMYK gradation information. The main scanning deviation correction processing unit 82 calculates the main scanning deviation amount based on the coordinates information and the CMYK gradation information for the extracted colorimetric areas. The main scanning deviation correction processing unit 82 subtracts the calculated main scanning deviation amount from the RGB difference in the colorimetric areas to form RGB difference data with the influence of the main scanning deviation removed.

At Step S125, the local θ calculation unit 83 calculates the local θ for each of the above segments based on the coordinates information, the CMYK information, and the RGB difference information subjected to the main scanning deviation correction processing of the colorimetric areas registered in the colorimetric list and stores the local θ in the storage unit 84.

At Step S126, the color tone control unit 28 determines whether the processing at Step S121 to Step S125 has been completed for all the images of one set as a certain number of images. If the processing at Step S121 to Step S125 for all the images of one set has not been completed, the process is returned to Step S121, and the processing at Step S121 to Step S125 is repeatedly executed. In contrast, if the processing at Step S121 to Step S125 for all the images of one set has been completed, the process advances to Step S127. Upon completion of the processing at Step S121 to Step S125 for all the images of one set, the local θ of each segment of all the images of one set is stored in the storage unit 84.

Next, upon completion of the processing at Step S121 to Step S125 for all the images of one set, the process advances to Step S127, then the sub scanning deviation correction processing unit 85 of the corrected TRC calculation unit 41 detects pairs of local θ calculated from the area in which the drum period of the photoconductor drum (e.g., the photoconductor drum 50$k$) is deviated by half phase among the pieces of local θ calculated by the local θ calculation unit 83 and averages the pairs of local θ to calculate the final θ value (the leveled θ).

Details of Technique for Calculating Leveled θ

The following describes a technique for calculating such a leveled θ in detail. First, FIG. 10 illustrates, at (a), an image in an ideal state in which no in-plane deviation occurs in both the main-scanning direction as a moving direction of an ink head relative to a sheet and the sub-scanning direction as a sheet conveyance direction and a color is uniformly printed on the sheet.

Figure 10:
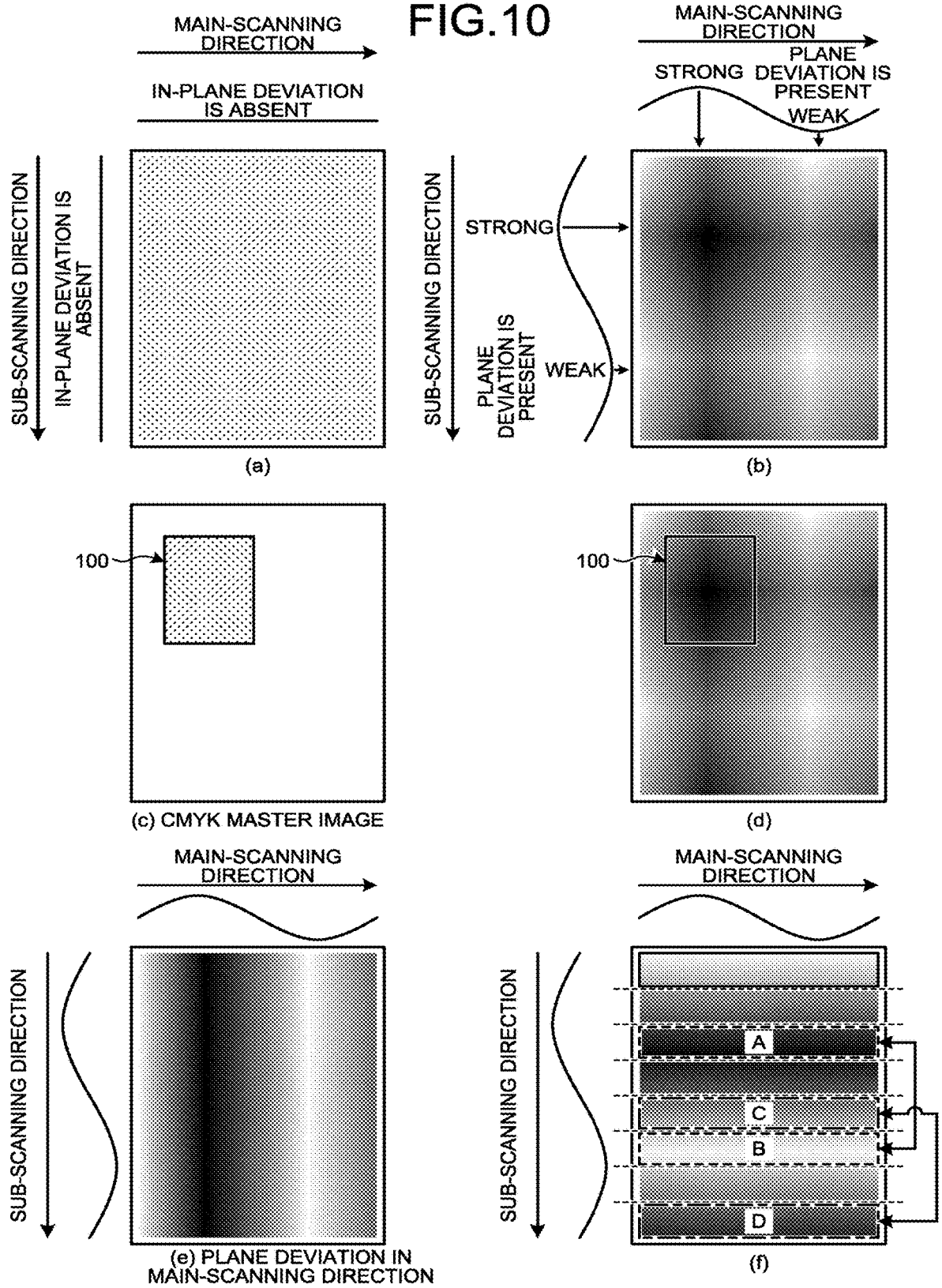
FIG. 10 is a diagram for illustrating in-plane deviation.

However, in reality, periodic in-plane deviation occurs in the main-scanning direction and the sub-scanning direction each as illustrated at (b) in FIG. 10 in many cases caused by variations in parts accuracy of the image forming apparatus 8 and the like. Such in-plane deviation becomes a noise when the θ value is calculated and causes an error.

A CMYK master image including an object 100 illustrated at (c) in FIG. 10 is printed on the image in which the in-plane deviation is occurring illustrated at (b) in FIG. 10 in a superimposed manner, for example. In this case, as illustrated at (c) in FIG. 10, the CMYK master image including the object 100 causes no color fluctuations as a whole, but when it is printed on the image in which the in-plane deviation is occurring illustrated at (b) in FIG. 10 in a superimposed manner, in the area of the object 100 in which a color is printed as illustrated at (d) in FIG. 10, the influence of the in-plane deviation illustrated at (b) in FIG. 10 strongly appears. Consequently, although the θ value is originally "0", the influence of an error appears in the θ value by the in-plane deviation. The same image does not necessarily appear on the next and later pages, and the manner of appearance of the in-plane deviation varies for each page, and correct gradation correction is difficult even when gradation correction is performed while the influence of the error of the in-plane deviation is exerted.

Given these circumstances, the image forming system according to the second embodiment equally extracts an area in which deviation with a thicker color appears and an area in which deviation with a thinner color appears and compensates the influence of the two to reduce the influence of the in-plane deviation.

Specifically, in the case of the main scanning deviation, as illustrated at (e) in FIG. 10, the influence in the sub-scanning direction is small. Given these circumstances, a deviation amount appearing in the coordinate in the main-scanning direction is calculated in advance and is removed from the RGB difference information of each colorimetric area, whereby the influence of deviation can be eliminated to some extent. However, to obtain higher gradation correction accuracy, the colorimetric areas are preferably evenly extracted from the main-scanning direction.

In the case of the sub scanning deviation, the influence in the main-scanning direction is small as illustrated at (f) in FIG. 10. Although periodicity is present due to the presence of an inter-paper gap in paper conveyance, the phase of the deviation changes for each page, and it is difficult to calculate the deviation amount in advance.

Given these circumstances, the image forming system according to the second embodiment regards segments at positions deviated by the half phase of the drum period as a pair and uses the average of the local θ calculated in those segments to compensate the influence of deviation. The deviation of segments not selected as a pair remains, and the local θ of the segments not selected is not used for the calculation of the leveled θ. When the pair of segments is difficult to be detected due to the arrangement of the image, the sub scanning deviation correction processing unit 85 does not calculate the average of the local θ of the pair and calculates the entire average of the local θ of valid segments. With this calculation, the influence of the entire sub scanning deviation can be reduced.

As an example, the sub scanning deviation correction processing unit 85 detects segments the deviation of which appears at opposite phase such as Segment A and Segment B illustrated at (f) in FIG. 10 as a pair. Segment C and Segment D, which are weak in deviation, are also positioned at opposite phase, and thus the sub scanning deviation correction processing unit 85 detects them as a pair.

Although the example of (f) in FIG. 10 illustrates eight segments, the number of segments per page may be any number, and one page can be divided into 16 segments as described above, for example. A segment of another page may be detected as a pair so long as it is within a set.

Validity Determination Operation

Next, at Step S128 of the flowchart of FIG. 9, the validity determining unit 91 of the validity determination processing unit 86 performs validity determination processing as determination whether the value of the leveled θ calculated by the sub scanning deviation correction processing unit 85 is a valid value for use in the gradation correction processing. At Step S128, the θ correction unit 92 of the validity determination processing unit 86 performs correction processing on the value of the leveled θ based on a determination result of the validity determining unit 91.

Specifically, when the validity is determined, an information amount required for the calculation of the θ value (an information amount used for the calculation of the θ value) and the possibility of a calculation error of the θ value occurring are required to be considered. In this example, the validity is determined from the two factors of the information amount required for the calculation of the θ value (the information amount used for the calculation of the θ value) and the possibility of the calculation error of the θ value occurring; the validity may be determined based on either one of the factors. In this case, a computation amount for determination computation of the validity can be reduced, and a determination result can be obtained at high speed.

The information amount required for the calculation of the θ value relates to the number of colorimetric areas, the number of segment pairs, and the exhaustivity of gradation colors. A larger number of colorimetric areas gives an increased available information amount, improving the validity. The same holds true for the number of segment pairs; a larger number thereof gives improved validity. The value "25 pairs" indicated in Table 1 below is a threshold for determining whether there are a sufficient number of pairs; the validity determining unit 91 averages the local θ for each pair to calculate the leveled θ when the number of pairs is 25 or more and does not calculate an average for each pair and averages all the segments to calculate the leveled θ when the number of pairs is less than 25.

As to the exhaustivity of gradation colors, when the gradation of the colorimetric area in a color plate is within a certain range, gradation out of the certain range is insufficient in information, and color fluctuations in the range may not be able to be accurately calculated. Given these circumstances, information on a wide range of gradations is obtained, whereby the determination accuracy of the above validity can be improved.

The possibility of the calculation error of the θ value occurring is caused by in-plane deviation, a processing time, and the like. As described above, when the in-plane deviation is included, the accuracy of θ value calculation degrades. Given these circumstances, a sufficient amount of information is preferably obtained from a wide range of colorimetric area to reduce the influence of the in-plane deviation. The validity determining unit 91 divides one page into three in the main-scanning direction and detects the rate of the number of colorimetric areas present within each divided range to determine whether colorimetric points are widely distributed. As to the sub scanning deviation, it is estimated that wide distribution is given, the number of segment pairs also increases in accordance with this distribution. Given these circumstances, as to the sub scanning deviation, the validity determining unit 91 performs determination based on the number of segment pairs.

As to the processing time, the user image is printed in parallel with the θ value calculation, and colors printed by the printer engine 4 may change with the passage of time. Consequently, there is a high possibility that the calculated θ value does not follow actual color changes fluctuating with time. Given these circumstances, as to the processing time, the validity determining unit 91 determines that the validity is lost if the printing processing is not completed within a certain time.

The following describes conditions for use in such validity determination processing with reference to Table 1 to Table 5 as examples. These Table 1 to Table 5 are specific conditions for determining the validity of the leveled θ calculated for each image set. The values in the tables are values totalized for each color plate and each set. These values are by way of examples and may be changed to any ones in accordance with design or the like.

First, the validity determining unit 91 determines that the calculated value of the leveled θ is "high in validity" when the conditions listed in the following Table 1 are met.

TABLE 1

Condition (1) Validity: high

| | |
|---|---|
| Gradation color | When colorimetric areas are classified into three gradation areas of highlight, middle, and shadow, by their color plates, there are 187 or more colorimetric areas in each of the gradation areas. |
| Main scanning deviation | When an image is divided into three in the main-scanning direction, there are ⅙ or more of the total number of colorimetric areas in each of three of left, central, and right areas. |
| Sub scanning deviation | 25 pairs or more of valid segments positioned at opposite phase are established. |
| Number of colorimetric areas | — |
| Processing time | Processing is completed within a set time. |
| Other | — |

As listed in Table 1, when the conditions are satisfied that when colorimetric areas are classified into three gradation areas of highlight, middle, and shadow, by their color plates, there are 187 or more colorimetric areas in each of the gradation areas (distribution of gradations of the basic colors); that when an image is divided into three in the main-scanning direction, there are ⅙ or more of the total number of colorimetric areas in each of three of left, central, and right areas; that 25 or more pairs of valid segments positioned at opposite phase of the sub scanning deviation are established; and that printing processing is completed within a set time, information with a sufficient information amount can be acquired to reduce an error, and the validity determining unit 91 determines that the calculated value of the leveled θ is "high in validity".

In the case of the conditions listed in Table 1, it is considered that both errors of the main scanning deviation and the sub scanning deviation can be sufficiently reduced. It is considered that a wide range of distribution is obtained in terms of each gradation. In Table 1, the condition of the number of colorimetric areas is blank; this is because some colorimetric areas are not used due to the processing of the pairs of the segments of the sub scanning, and designation at this part is meaningless, a specific number is designated by gradation colors as a substitute, and the like.

Next, the validity determining unit 91 determines that the calculated value of the leveled θ is "high in validity" when the conditions listed in the following Table 2 are met.

TABLE 2

Condition (2) Validity: high

| | |
|---|---|
| Gradation color | When colorimetric areas are classified into three gradation areas of highlight, middle, and shadow, by their color plates, there are ⅙ or more of the total number of colorimetric areas in each of the gradation areas. |
| Main scanning deviation | When an image is divided into three in the main-scanning direction, there are ⅙ or more of the total number of colorimetric areas in each of three of left, central, and right areas. |
| Sub scanning deviation | — |
| Number of colorimetric areas | There are 560 or more colorimetric areas in total. |
| Processing time | Processing is completed within a set time. |
| Other | — |

As listed in Table 2, when the conditions are satisfied that when calorimetric areas are classified into three gradation areas of highlight, middle, and shadow, by their color plates, there are ⅙ or more of the total number of colorimetric areas in each of the gradation areas; that when an image is divided into three in the main-scanning direction, there are ⅙ or more of the total number of calorimetric areas in each of three of left, central, and right areas; that there are 560 or more calorimetric areas in total; and that printing processing is completed within a set time, the validity determining unit 91 determines that the calculated value of the leveled θ is "high in validity".

The conditions listed in Table 2 are conditions in which it is considered that although the number of segment pairs of the sub scanning could not have been sufficiently acquired, there are sufficient colorimetric areas, and the influence of the sub scanning deviation can be covered. In the conditions listed in Table 2, a specific value is set for the determination of the number of the colorimetric areas, and the gradation colors are determined by the rate of the number of the colorimetric areas.

Next, the validity determining unit 91 determines that the calculated value of the leveled θ is "medium in validity" when the conditions listed in the following Table 3 are met.

TABLE 3

Condition (3) Validity: medium

| | |
|---|---|
| Gradation color | When colorimetric areas are classified into three gradation areas of highlight, middle, and shadow, by their color plates, there are one or more gradation areas in which there are 187 or more colorimetric areas. |

TABLE 3-continued

Condition (3) Validity: medium

| | |
|---|---|
| Main scanning deviation | When an image is divided into three in the main-scanning direction, there are ⅛ or more of the total number of colorimetric areas in each of three of left, central, and right areas. |
| Sub scanning deviation | — |
| Number of colorimetric areas | There are 360 or more colorimetric areas in total. |
| Processing time | Processing is completed within a set time. |
| Other | Conditions (1) and (2) are not satisfied. |

As listed in Table 3, when colorimetric areas are classified into three gradation areas of highlight, middle, and shadow, by their color plates, there are one or more gradation areas in which there are 187 or more colorimetric areas; when an image is divided into three in the main-scanning direction, there are ⅛ or more of the total number of colorimetric areas in each of three of left, central, and right areas; when there are 360 or more colorimetric areas in total; when printing processing is completed within a set time; and when the conditions listed in Table 1 and Table 2 are not satisfied, the validity determining unit 91 determines that the calculated value of the leveled θ is "medium in validity".

The conditions listed in Table 3 are conditions indicating that there is a possibility that any of the main scanning, the sub scanning, and the gradation colors cannot completely cover an error occurring in the leveled θ.

Next, the validity determining unit 91 determines that the calculated value of the leveled θ is "low in validity" when the conditions listed in the following Table 4 are met.

TABLE 4

Condition (4) Validity: low

| | |
|---|---|
| Gradation color | — |
| Main scanning deviation | — |
| Sub scanning deviation | — |
| Number of colorimetric areas | There are one or more colorimetric areas in total. |
| Processing time | Processing is completed within a set time. |
| Other | Conditions (1), (2), and (3) are not satisfied. |

As listed in Table 4, when there are one or more colorimetric areas in total; when printing processing is completed within a set time; and when the conditions listed in Table 1 to Table 3 are not satisfied, the validity determining unit 91 determines that the calculated value of the leveled θ is "low in validity". In other words, the conditions listed in Table 4 are conditions indicating that there are only a minimum number of calorimetric areas. In this condition, there is a high possibility that an error is substantially large, and the validity determining unit 91 determines that the calculated value of the leveled θ is "low in validity".

Next, the validity determining unit 91 determines that the calculated leveled θ is "invalid" when the conditions listed in the following Table 5 are met.

TABLE 5

Condition (5) Validity: invalid

| | |
|---|---|
| Gradation color | — |
| Main scanning deviation | — |
| Sub scanning deviation | — |
| Number of colorimetric areas | — |
| Processing time | — |
| Other | Conditions (1), (2), (3), and (4) are not satisfied. |

Table 5 is a condition indicating that none of the conditions listed in Table 1 to Table 4 is satisfied and that there are no colorimetric areas. In this case, there are no materials for determining color fluctuations, and the calculated leveled θ is discarded.

The colorimetric areas obtained for each page alone are often insufficient in an information amount for calculating the θ value with high precision, and in the case of the image forming system according to the second embodiment, a few pages are integrated to form one set, and the θ value is calculated for each set and is fed back to the gradation processing unit 31. With this operation, the number of colorimetric areas and the number of segment pairs can be easily ensured. In the above image forming system, the above validity determination processing is also performed for each set, whereby determination in line with the mechanism of the θ value calculation of the image forming system according to the second embodiment can be performed.

For the number of pages of one set, the number of pages (e.g., about eight A3 size) that can ensure the number of colorimetric areas and empirically sufficiently ensure the number of segment pairs of the sub scanning in a general document such as a catalogue is set in advance. Alternatively, the number of pages of one set, without being set in advance, may be dynamically determined; printing and scanning of a document are repeated, and the number of pages at the point in time when the number of calorimetric areas and the number of segment pairs of the sub scanning corresponding to the conditions listed in Table 1 or the conditions listed in Table 2 have been obtained may be determined to be one set.

θ Value Correction Operation

Next, at Step S128 of the flowchart of FIG. 9, the θ correction unit 92 of the validity determination processing unit 86 performs correction processing on the value of the leveled θ based on the determination result of the validity determining unit 91 to reduce the influence of an error. The following Table 6 to Table 9 are tables indicating thresholds and correction values for determining the appropriateness of correction to be applied to the θ value depending on the conditions described in Table 1 to Table 5. As an example, the magnitude relation among the values listed in Table 6 to Table 9 is "Value A>Value B>Value C>Value D" and "Coefficient F>Coefficient G>Coefficient H". Such values and coefficients may be set based on the way a fluctuation model is taken or the like.

TABLE 6

| | Conditions (1) and (2) Validity: high | | |
|---|---|---|---|
| θ value | D or more | Less than D and C or more | Less than C |
| Abnormality notification | Image density abnormality | None | None |
| θ value correction | Correct to 0 (No TRC update) | Multiply θ value by Coefficient H | No correction applied |

First, Table 6 is a table indicating a threshold and a correction value for determining the appropriateness of correction to the leveled θ value the validity of which has been determined to be "high" based on the conditions listed in Table 1 and Table 2. As indicated in Table 6, when the leveled θ value the validity of which has been determined to be "high" is a value of Value D or more, the θ correction unit 92 provides notification (a voice message, a text-based error message, an electronic sound, or the like) of the occurrence of an image density abnormality via a notification unit, for example, and corrects the leveled θ value to "0". In this case, the gradation correction data (TRC) is not updated. When the leveled θ value the validity of which has been determined to be "high" is a value of less than Value D and Value C or more, the θ correction unit 92 multiplies the leveled θ value by Coefficient H to correct it as an example. When the leveled θ value the validity of which has been determined to be "high" is a value of less than Value C, the θ correction unit 92 does not apply any correction to the leveled θ value.

TABLE 7

| | Condition (3) Validity: medium | | |
|---|---|---|---|
| θ value | D or more | Less than D and B or more | Less than B |
| Abnormality notification | Image density abnormality | None | None |
| θ value correction | Correct to 0 (No TRC update) | Multiply θ value by Coefficient G | No correction applied |

Next, Table 7 is a table indicating a threshold and a correction value for determining the appropriateness of correction to the leveled θ value the validity of which has been determined to be "medium" based on the conditions listed in Table 3. As indicated in Table 7, when the leveled θ value the validity of which has been determined to be "medium" is a value of Value D or more, the θ correction unit 92 provides notification (a voice message, a text-based error message, an electronic sound, or the like) of the occurrence of an image density abnormality via the notification unit, for example, and corrects the leveled θ value to "0". In this case, the gradation correction data (TRC) is not updated. When the leveled θ value the validity of which has been determined to be "medium" is a value of less than Value D and Value B or more, the θ correction unit 92 multiplies the leveled θ value by Coefficient G to correct it as an example. When the leveled θ value the validity of which has been determined to be "medium" is a value of less than Value B, the θ correction unit 92 does not apply any correction to the leveled θ value.

TABLE 8

| | Condition (4) Validity: low | | |
|---|---|---|---|
| θ value | D or more | Less than D and A or more | Less than A |
| Abnormality notification | Image density abnormality | None | None |
| θ value correction | Correct to 0 (No TRC update) | Multiply θ value by Coefficient F | No correction applied |

Next, Table 8 is a table indicating a threshold and a correction value for determining the appropriateness of correction to the leveled θ value the validity of which has been determined to be "low" based on the conditions listed in Table 4. As indicated in Table 8, when the leveled θ value the validity of which has been determined to be "low" is a value of Value D or more, the θ correction unit 92 provides notification (a voice message, a text-based error message, an electronic sound, or the like) of the occurrence of an image density abnormality via the notification unit, for example, and corrects the leveled θ value to "0". In this case, the gradation correction data (TRC) is not updated. When the leveled θ value the validity of which has been determined to be "low" is a value of less than Value D and Value A or more, the θ correction unit 92 multiplies the leveled θ value by Coefficient F to correct it as an example. When the leveled θ value the validity of which has been determined to be "low" is a value of less than Value A, the θ correction unit 92 does not apply any correction to the leveled θ value.

TABLE 9

| | Condition (5) Validity: invalid |
|---|---|
| θ value | — |
| Abnormality notification | None |
| θ value correction | Correct to 0 (No TRC update) |

Next, Table 9 is a table indicating a threshold and a correction value for determining the appropriateness of correction to the leveled θ value the validity of which has been determined to be "invalid" based on the conditions listed in Table 5. As indicated in Table 9, when the validity is determined to be "invalid", the θ correction unit 92 corrects the leveled θ value to "0". In this case, the gradation correction data (TRC) is not updated.

That the θ value of the leveled θ is large means that colors fluctuate accordingly. Given these circumstances, the θ correction unit 92 determines that there is a high possibility that the influence of an error is strong when the θ value is a certain threshold or more and in contrast determines that the influence of an error is weak when the θ value is less than the certain threshold. When the θ value is large by the influence of an error, if the gradation correction data (TRC) is generated as it is, there is a high possibility of overcorrection, and the θ correction unit 92 corrects the θ value so as to give a smaller value.

In contrast, when the θ value is small, even with the influence of an error, there is a low possibility of overcorrection, and correction applied leads to lack of control, and there is a high possibility that it is difficult to eliminate color fluctuations. In this case, the θ correction unit 92 does not apply any correction to the θ value.

Also when large color fluctuations occur, not due to the influence of an error, the θ value is large, and correction to the θ value is applied; in this case also, gradation correction processing for a few sets is repeated, whereby the color fluctuations can be gradually returned to the original while preventing overcorrection. When a separate function for correcting color fluctuations is provided together with a function of performing real-time gradation correction processing of the image forming system according to the second embodiment for engine process control or the like, double correction is performed together with this correction processing of the separate function, whereby the inconvenience of overcorrection can be minimized. When the value of the θ value is extremely large, there is a high possibility that an abnormality is occurring in the printer engine 4, and the θ correction unit 92 provides notification (a voice message, a text-based error message, an electronic sound, or the like) of the occurrence of the abnormality via the notification unit and performs processing to eliminate the abnormality of the printer engine 4.

Effects by θ Value Correction

Figure 11:
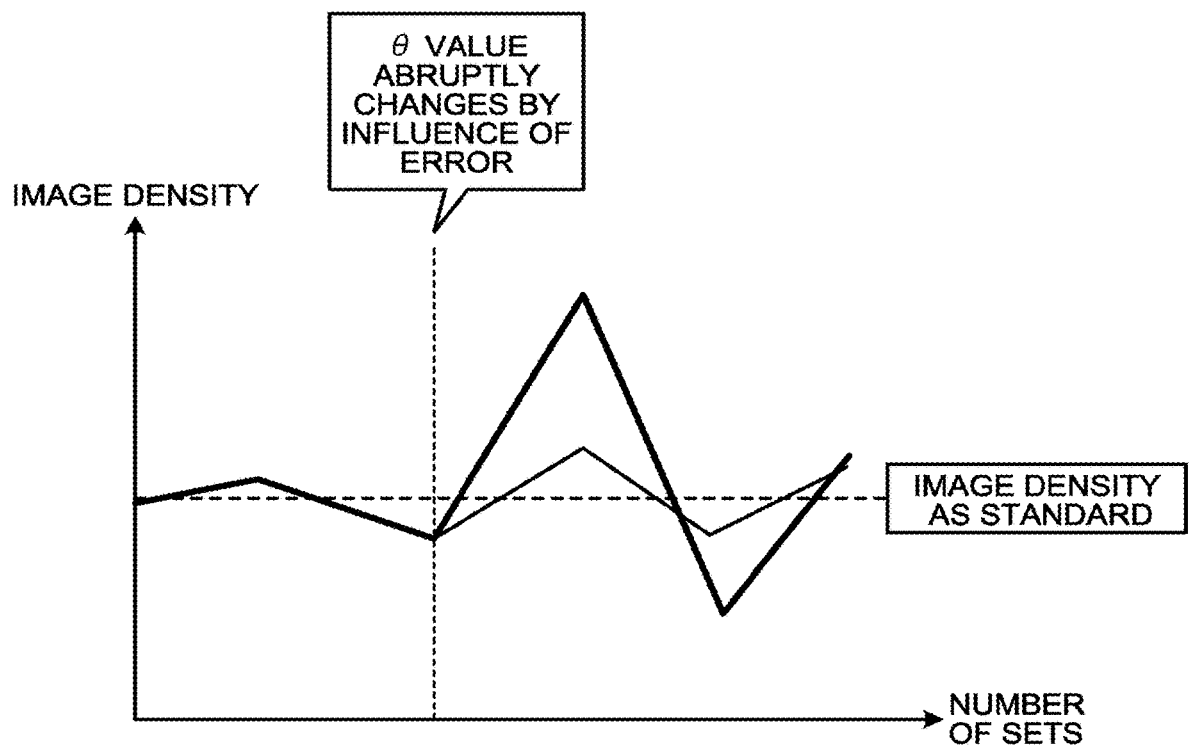
FIG. 11 is a diagram of image density characteristics before and after gradation correction processing in the image processing system according to the second embodiment.

FIG. 11 is a graph representing a relation between image density fluctuations and the number of sets printed. The thick line graph indicates color fluctuations when θ value correction by validity determination is not applied, and the thin line graph indicates color fluctuations when θ value correction by validity determination is applied. The dotted line indicates an image density as a standard. In real-time gradation correction processing, gradation correction processing is preferably performed such that the color fluctuations are close to the image density as the standard indicated by the dotted line.

When the influence of an error becomes large at a certain point in time, if the θ value is not corrected, an image density change becomes large relative to the standard image density as indicated by the thick line graph. When the image density change becomes large, when the θ value is restored to the original value in the next set, an error is large, and there is a possibility of another overcorrection.

in contrast, when the above correction processing is applied to the θ value when the influence of an error becomes large at the certain point in time, the image density change can be reduced as indicated by the thin line graph. Before the influence of an error on the θ value becomes large, control equal to when no correction is applied to the θ value is performed, which does not lead to lack of control.

Printing Processing

Next, when the correction processing corresponding to the validity of the leveled θ value is thus applied to the leveled θ value, the process advances to Step S129 of the flowchart of FIG. 9. At Step S129, the synthesis unit 93 updates the gradation correction data (corrected TRC) to the value supplied from the θ correction unit 92. This gradation correction data (corrected TRC) is transferred to the gradation processing unit 31 by the transfer unit of the corrected TRC calculation unit 41 at Step S130. At Step S131, the gradation processing unit 31 applies gradation correction processing based on the updated corrected TRC to the CMYK master image acquired by the image processing unit 3 and supplies the CMYK master image to the printer engine 4. With this operation, printing with the corrected TRC reflected can be executed.

Finally, at Step S132, the printer engine 4 determines whether printing of all pages designated by the user has been completed. If the printing of all pages has not been completed (No at Step S132), the process returns to Step S122, and the processing at Step S122 and later steps is repeatedly executed. In contrast, if the printing of all pages has been completed (Yes at Step S132), the processing of the flowchart of FIG. 9 ends.

Effects of Second Embodiment

As is clear from the foregoing description, the image processing system according to the second embodiment makes one set from a plurality of images and can thereby compensate for the information amount insufficient in a single image. Considering the information amount (the number of colorimetric areas for each image density distribution and an in-plane fluctuation amount that is thought to be given to the image) within the set, the validity of the set (the validity of the above leveled θ value) is determined. A threshold or an adjustment rate for adjusting a correction amount is determined in accordance with a determination result.

Specifically, when the correction amount (the leveled θ value) exceeds a certain threshold, the possibility of the influence of an error is regarded as high, and the correction amount (the leveled A value) is multiplied by the adjustment rate to reduce the correction amount, and the inconvenience of overcorrection can be prevented. When a large correction amount is calculated caused by actual abrupt color fluctuations not by an error, for example, it is difficult to perform sufficient correction within the set, but in the next and later sets, gradation correction processing can be performed while gradually making the correction amount close to a correct correction amount while preventing overcorrection.

Consequently, the inconvenience of the correction amount abruptly increasing can be prevented, and the correction amount can be made close to the correct correction amount by a smaller number of sets than a technique that determines the upper limit of the correction amount and a technique that skips the correction of that set. Consequently, gradation correction accuracy can be improved.

Finally, the above embodiments are presented by way of example and do not intend to limit the scope of the present invention. Although in the description of the embodiments user image colorimetric RGB by the scanner 150 is used as an evaluation value in order to simplify the description, Lab (L: brightness, a: green/red, b: blue/yellow) obtained by converting them or the like may be used in place of RGB, for example. By using color specification values of a uniform color space such as Lab, control with a higher degree of fidelity to a color difference is enabled. As an example, when the Lab values are used, the RGB values in Expression (1) to Expression (8) may be replaced with Lab values, and with Jacobian matrix for RGB→Lab conversion as "J'", the Jacobian matrix "J" may be replaced with "J'J". In this case also, an effect similar to the above can be obtained.

Although in the above description of the embodiments the user image colorimetric RGB by the image inspection unit 5 is used as the evaluation value in order to simplify the description, Lab (L: brightness, a: green/red, b: blue/yellow) obtained by converting them or the like may be used in place of RGB. By using color specification values of a uniform color space such as Lab, control with a higher degree of fidelity to a color difference is enabled. In this case also, an effect similar to the above can be obtained.

An embodiment provides an effect of making it possible to provide an image stabilizing technique that maintains an initial print state and to stabilize color reproducibility in print jobs.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus comprising:
   a reflection characteristic detector configured to detect reflective characteristics of respective output images on respective print media formed in a temporarily shifted manner among print media on which output images corresponding to input image data are formed; and
   a gradation characteristic correction unit configured to correct gradation characteristics of the input image data such that the reflection characteristics of the respective output images on the respective print media detected by the reflection characteristic detector match.

2. The image processing apparatus according to claim 1, wherein
   the reflection characteristic detector comprises a gradation control parameter calculation unit configured to calculate gradation control parameters for controlling gradation characteristics of a basic color of output images formed on the print media, based on reflection characteristics of the output images formed on the print media, and
   the gradation characteristics correction unit is configured to correct the gradation characteristics of the input image data based on a result of comparison between a set of first gradation control parameters and a set of second gradation control parameters, the set of first gradation control parameters being a gradation control parameter calculated by the gradation control parameter calculation unit and serving as a standard value, the set of second gradation control parameters being newly calculated by the gradation control parameter calculation unit.

3. The image processing apparatus according to claim 2, wherein the gradation control parameter calculation unit is configured to calculate the set of first gradation control parameters and the set of second gradation control parameters, based on a calculation condition switched based on any of or a combination of a number of sheets printed, a print time, and a measured value of an image of a colorimetric area.

4. The image processing apparatus according to claim 1, wherein
   the reflection characteristic detector comprises a gradation control parameter calculation unit configured to, when the same image is successively formed on the print media, calculate a gradation control parameter for controlling gradation characteristics of a basic color of the output images formed on the print media, based on a difference between a measured value of reflection characteristics of an initial image set and a measured value of reflection characteristics of an image set other than the initial image set, and
   the gradation characteristic correction unit is configured to correct gradation characteristics of the input image data based on the gradation control parameter calculated by the gradation control parameter calculation unit.

5. The image processing apparatus according to claim 2, wherein the gradation control parameter calculation unit calculates three or less gradation control parameters for each basic color.

6. The image processing apparatus according to claim 2, further comprising a prediction unit configured to form a predicted value of reflection characteristics of the output images, wherein
   the gradation control parameter calculation unit is configured to
   when different images are successively formed on the print media, set the predicted value as the standard value, compare a measured value of reflection characteristics of an initial image with the predicted value to calculate the set of first gradation control parameters, and compare an image after the initial image with the predicted value to calculate the set of second gradation control parameters, and
   when the same image is successively formed on the print media, calculate the set of first gradation control parameters from a measured value of reflection characteristics of an initial image set and calculate the set of second gradation control parameters based on input image data other than the initial image set.

7. The image processing apparatus according to claim 2, further comprising:
   a determining unit configured to performing determining whether the gradation control parameter calculated by the gradation control parameter calculation unit has a valid value for use in correction of gradation characteristics of the input image data in the gradation characteristic correction unit based on a certain information amount; and a correction unit configured to correct a value of the gradation control parameter based on a determination result of the determining unit.

8. The image processing apparatus according to claim 7, wherein the determining unit is configured to perform the determining using a number of colorimetric areas of the input image data as the certain information amount.

9. The image processing apparatus according to claim 7, wherein the determining unit performs the determining using a number of colorimetric areas corresponding to a certain gradation of the input image data as the certain information amount.

10. The image processing apparatus according to claim 7, wherein the determining unit performs the determining using colorimetric area distribution of the output images.

11. The image processing apparatus according to claim 7, wherein the determining unit performs the determining with a certain plurality of pages as one set, and the correction unit performs the correcting with a certain plurality of pages as one set.

12. The image processing apparatus according to claim 7, wherein the determining unit performs the determining with a number of pages when a certain number of colorimetric areas of the output images are obtained, as one set.

13. The image processing apparatus according to claim 7, wherein the image processing apparatus has two-stage thresholds including a first threshold for a value of the gradation control parameter and a second threshold having a value higher than the first threshold, and the correction unit is configured to, when the value of the gradation control parameter is the first threshold or more and less than the second threshold, correct the value of the gradation control parameter using a correction value multiplied by a certain coefficient.

14. The image processing apparatus according to claim 7, wherein the image processing apparatus has two-stage thresholds including a first threshold for a value of the gradation control parameter and a second threshold having a value higher than the first threshold, and the correction unit is configured to, when the value of the gradation control parameter is less than the first threshold, do not correct the value of the gradation control parameter.

15. The image processing apparatus according to claim 7, wherein the image processing apparatus has two-stage thresholds including a first threshold for a value of the gradation control parameter and a second threshold having a value higher than the first threshold, and the correction unit is configured to, when the value of the gradation control parameter is the second threshold or more, corrects the value of the gradation control parameter to "0".

16. An image processing system comprising:

a gradation processing unit configured to perform gradation correction on an input image;

a printing unit configured to print the input image;

an image reading unit configured to read a print image of the input image printed by the printing unit; and the image processing apparatus according to claim 1.

17. A computer program product comprising a non-transitory computer-readable medium including programmed instructions that cause a computer to function as:

a reflection characteristic detector configured to detect reflective characteristics of respective output images on respective print media formed in a temporarily shifted manner among print media on which output images corresponding to input image data are formed; and a gradation characteristic correction unit configured to correct gradation characteristics of the input image data such that the reflection characteristics of the respective output images on the respective print media detected by the reflection characteristic detector match.

* * * * *